June 9, 1953 A. H. DICKINSON 2,641,407

ELECTRONIC MULTIPLIER

Filed June 18, 1949 15 Sheets-Sheet 1

INVENTOR
Arthur H. Dickinson
BY Dwight D. Mooney
AGENT

FIG. 2
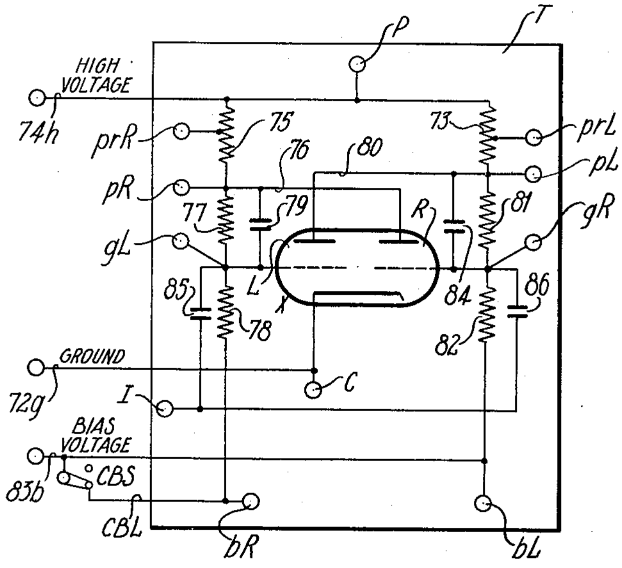
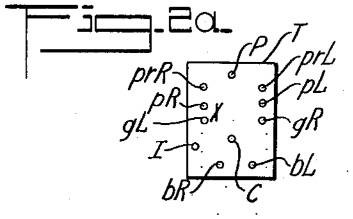
FIG. 4
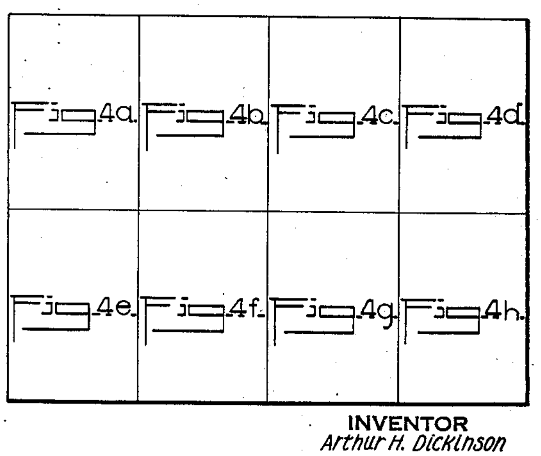
FIG. 3
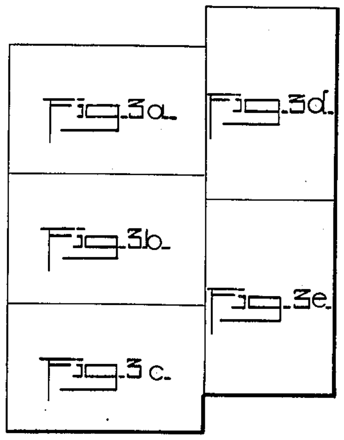
INVENTOR
Arthur H. Dickinson
BY Dwight D. Mooney
AGENT June 9, 1953 A. H. DICKINSON 2,641,407

ELECTRONIC MULTIPLIER

Filed June 18, 1949 15 Sheets-Sheet 3

INVENTOR
Arthur H. Dickinson

BY Dwight D. Mooney
AGENT

ELECTRONIC MULTIPLIER

Filed June 18, 1949 15 Sheets-Sheet 4

INVENTOR
Arthur H. Dickinson

BY Dwight D. Mooney
AGENT

ELECTRONIC MULTIPLIER

Filed June 18, 1949 15 Sheets-Sheet 5

INVENTOR
Arthur H. Dickinson
BY Dwight D. Mooney
AGENT

INVENTOR
Arthur H. Dickinson
BY Dwight D. Mooney
AGENT

June 9, 1953 A. H. DICKINSON 2,641,407

ELECTRONIC MULTIPLIER

Filed June 18, 1949 15 Sheets-Sheet 7

INVENTOR
Arthur H. Dickinson
BY Dwight D. Mooney
AGENT

INVENTOR
Arthur H. Dickinson
BY Dwight D. Mooney
AGENT

INVENTOR
Arthur H. Dickinson
BY Dwight D. Mooney
AGENT

June 9, 1953 A. H. DICKINSON 2,641,407

ELECTRONIC MULTIPLIER

Filed June 18, 1949 15 Sheets-Sheet 10

INVENTOR
Arthur H. Dickinson

BY Dwight D. Mooney
AGENT

INVENTOR
Arthur H. Dickinson
BY Dwight D. Mooney
AGENT

INVENTOR
Arthur H. Dickinson
BY Dwight D. Mooney
AGENT

June 9, 1953 A. H. DICKINSON 2,641,407

ELECTRONIC MULTIPLIER

Filed June 18, 1949 15 Sheets-Sheet 13

INVENTOR
Arthur H. Dickinson

BY Dwight D. Mooney
AGENT

INVENTOR
Arthur H. Dickinson
BY Dwight D. Mooney
AGENT

INVENTOR
Arthur H. Dickinson
BY Dwight D. Mooney
AGENT

Patented June 9, 1953

2,641,407

UNITED STATES PATENT OFFICE 2,641,407

ELECTRONIC MULTIPLIER

Arthur H. Dickinson, Greenwich, Conn., assignor to International Business Machines Corporation, New York, N. Y., a corporation of New York Application June 18, 1949, Serial No. 99,959

19 Claims. (Cl. 235—61)

This invention relates to electronic multipliers and more particularly to such a multiplier wherein the product is obtained by over-and-over addition without employing column shift.

One of the principal considerations in multiplier design has been the speed of the multiplying operation. To effect an increase in this speed, column shift is employed to decrease the number of cycles of operation required to solve a given problem. Such is desirable in mechanical multipliers due to the inherent factors limiting their speed of operation. However, an electronic multiplier operates so fast that the number of cycles of operation necessary to solve a given problem ceases to be a major consideration so far as its practical applications are concerned.

Accordingly, a principal object of this invention is to provide an improved electronic multiplier which does not employ column shift.

Another object is to provide a novel electronic multiplier wherein to obtain a product the multiplicand is entered into the result register a number of times equal to the multiplier.

Another object is to provide a novel multiplier sequentially operable in response to input entries and having a single order multiplicand receiving device to accommodate a multiplicand having a plurality of orders.

A further object is to provide a novel circuit for effecting carry between the digit receiving input orders of the result register when no entries are being received by those orders.

A further object is to provide an electronic multiplier having a novel multiplicand receiving device wherein the value of the multiplier determines the entry of pulses into the multiplicand receiving device.

Another object is to provide a novel single order multiplicand receiving device having a series of digit-representing push-button type switches for each order of the multiplicand, said switches corresponding to the digit-representing elements of the receiving device and connected to transfer a response therefrom in accordance with the value of the respective digits of the multiplicand.

Another object is to provide a novel circuit arrangement to permit the simultaneous entry of all digital values of the multiplicand into the result register during one cycle of the multiplicand receiving device.

Another object is to provide a novel circuit arrangement wherein a change in the stable condition of one digit-representing element of the multiplier receiving device is utilized to prevent further entries into the multiplicand receiving device, the result register and the multiplierreceiving device.

A further object is to provide a novel coincidence circuit responsive to produce an output upon the receipt of the third of three preselected voltages and upon the removal of any one of said voltages thereafter.

A further object is to provide a novel multiplier interpreter circuit selectively responsive to a stable condition of the multiplier receiving device to permit entries into the multiplicand receiving device.

An ancillary object is to provide a circuit which is responsive to pulses, when read out pulses are not being made into the multiplicand receiving device, to effect a simultaneous switching of all the digit-representing elements thereof to a preselected stable condition.

Another object is to provide an electronic multiplier wherein the pulse source used to effect sequential operation of the multiplicand receiving device produces pulses at least ten times as frequently as the occurrence of the pulses used to initiate that sequential operation.

A still further object is to provide a novel circuit arrangement including a trigger switchable to one stable condition in response to a pulse from one source so that it permits entries to be made into the multiplicand receiving device and switchable to its other stable condition in response to a pulse from another source only when the multiplicand receiving device has completed a cycle of operation.

A still further object is to provide a novel circuit arrangement permitting the entry of a number of pulses equal to one less than the value of each digit, other than zero, of the multiplicand into each corresponding order of the result register when the multiplicand receiving device is being sequentially operated and permitting only one additional entry to be made simultaneously into each such order of the result register, said entries also being made prior to the switching of the digit-representing elements of the multiplicand receiving device to their preselected condition of stability.

Generally, the invention comprises a source of pulses, multiplicand and multiplier receiving devices and a result register inter-connected in a novel manner to perform the multiplication of two numbers representing a multiplicand and a multiplier, respectively. The multiplicand and multiplier are entered into their respective receiving devices by depressing the proper push-button switches thereof and their product is displayed by the result register. The novel multiplicand receiving device uses a single series of nine digit-representing elements to accommodate a multiplicand having a plurality of digital orders.

The closing of a calculate switch conditions the entire multiplier to start multiplication of the entered numbers in response to the source of pulses. A novel multiplier interpreter circuit is provided to respond to the multiplier receiving device to effect the operation of a trigger when the multiplier receiving device has received a number of pulses equal to the one-thousands complement of the particular multiplier used. When the stable condition of the trigger is switched it causes an electronic gate control circuit to be energized to permit read out pulses to be entered into the multiplicand receiving device to effect a sequential switching of the digit-representing elements thereof.

When the multiplicand receiving device receives a number of entries equal to the tens complement of the multiplicand digit of the lowest order and the nines complement of each higher order thereof an electronic gate is opened to permit entries into the corresponding order of the result register. When the multiplicand receiving device completes its sequential swiching it biases the electronic gate controlling trigger so that the trigger is subsequently returned to its original condition. Simultaneously with this return another entry is made into each order of the result register corresponding to the orders of the multiplicand. When this occurs the multiplicand has been entered into the result register one time.

The gate controlling trigger is again energized and the multiplicand is again entered into the result register. Such is continued until the trigger cannot be energized again because of the completion of a cycle of operation by the multiplier receiving device. The multiplicand has now been entered into the result register a number of times equal to the multiplier.

Other objects of the invention will be pointed out in the following description and claims and illustrated in the accompanying drawings, which disclose, by way of example, the principle of the invention and the best mode, which has been contemplate, of applying that principle.

In the drawings:

Fig. 2 is a circuit diagram of a trigger circuit typical of those employed by the invention.

Figure 1:
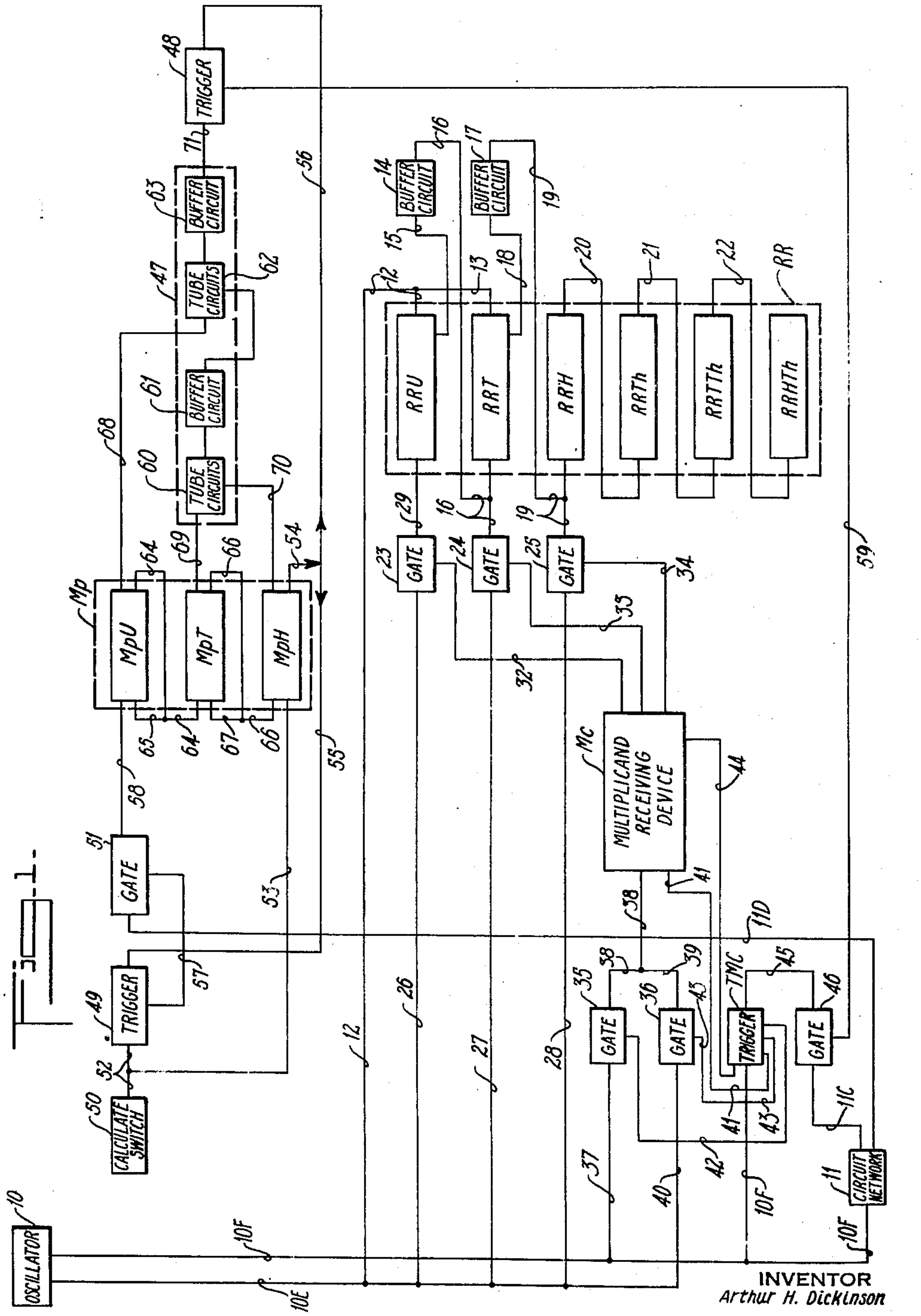
Fig. 1 is a block diagram illustrating one embodiment of the multiplier of the invention.

Fig. 2*a* is a diagrammatic showing of the trigger circuit of Fig. 2.

Fig. 3 shows the relative arrangement of subsequent figures to realize the complete circuit diagram of the multiplier.

Figs. 3*a*, 3*b*, 3*c*, 3*d*, and 3*e* taken together comprise a circuit diagram of the multiplier.

Fig. 4 shows the relative arrangement of subsequent figures to realize a timing chart representative of the operation of the multiplier in performing a specified problem; and, Figs. 4*a*, 4*b*, 4*c*, 4*d*, 4*e*, 4*f*, 4*g*, and 4*h* taken together represent a timing chart showing the operation of a multiplier when the solution of a specified problem is accomplished.

Various electronic circuits, each employing one tube, are employed by the invention. When the electrode potentials of the tubes are at certain predetermined values, these tubes respond to an input pulse to momentarily change their conductive state and usually to effect some other operation. When the electrode potentials are at certain other values the tubes will not respond to an input pulse. Such circuits are referred to herein as gates and the tubes employed in the circuits are referred to as gate tubes. When such a tube will not respond to its usual input pulse it is referred to as "de-conditioned" and when it will respond to that input it is referred to as "conditioned."

A number of trigger circuits are employed having two tubes, one conductive and the other non-conductive and vice versa to represent two stable conditions. These two conditions are referred to herein as the Left and Right condition. "Left condition" means that the left-hand tube of the trigger is conductive and that the right-hand tube is non-conductive. "Right condition" means that the right-hand tube of the trigger is conductive and that the left-hand tube is non-conductive.

To facilitate the description the specification is divided into a number of designated parts. Portions of the multiplier which do not have a designated part therefor are described in connection with the designated part deemed most pertinent.

*General description*

The general scheme of the invention will now be explained with reference to the block diagram of Fig. 1.

To effect multiplication the multiplicand is entered in the result register a number of times equal to the multiplier. The speed of the actual multiplication is determined by the frequency of the pulses used to effect it which pulses may be of a fixed frequency or may occur at random.

The pulses used to effect operation are derived from an oscillator 10 and a circuit network 11 actuated by the oscillator 10. The oscillator 10 produces two distinct series of positive and negative pulses. The pulses of one series are referred to as E pulses and the pulses of the other series are referred to as F pulses. The positive E pulses are one-hundred-and-eighty degrees out of phase with the negative E pulses and in phase with the negative F pulses. Accordingly, the positive F pulses are one-hundred-and-eighty degrees out of phase with the negative F pulses and in phase with the negative E pulses. The E pulses appear on a lead 10E and the F pulses appear on a lead 10F.

The F pulses are transferred over the lead 10F to actuate circuit network 11 to cause it to produce two distinct series of positive and negative pulses. The pulses of one series are referred to as C pulses and the pulses of the other series are referred to as D pulses. The positive C pulses are one-hundred-and-eighty degrees out of phase with the negative C pulses and in phase with the negative D pulses. Accordingly, the positive D pulses are one-hundred-and-eighty degrees out of phase with the negative D pulses and in phase with the negative C pulses. One C pulse and one D pulse occur for each sixteenth negative F pulse. The C pulses appear on a lead 11C and the D pulses appear on a lead 11D.

The multiplicand receiving device Mc comprises a single order receiving device sequentially operable to produce an output for each order of the multiplicand in response to the condition of the associated push-button switches provided to accommodate a multiplicand of three orders. The multiplier receiving device M*p* comprises a separate order for each order of the multiplier, there being shown the orders MpU, MpT, and MpH corresponding respectively to the units, tens, and hundreds digit of the multiplier. The particular corresponding multiplier digit is entered in the correct order of the multiplier by depressing the correct push-button switch associated therewith.

The result register RR comprises six orders labeled RRU, RRT, RRH, RRTh, RRTTh, and RRHTh to designate the units, tens, hundreds, thousands, ten-thousands, and hundred-thousands orders, respectively. E pulses are continuously transferred over the leads 10E and 12 to the units order RRU and over the leads 10E, 12 and 13 to the tens order RRT. The six orders of the result register are provided to accommodate the product of a three-digit multiplicand and a three-digit multiplier as provided for in the multiplicand and multiplier receiving devices.

The buffer stage 14 is energized over a lead 15 from the units order RRU of the result register and the output of the buffer stage is transferred over a lead 16 to the tens order RRT to effect carry thereto after each tenth pulse is applied to RRU. The buffer stage 14 provides a delay in transferring the pulse from RRU to RRT so that the carry pulse will not be applied to RRT at the same time it receives its normal input pulse. When RRU produces an output pulse in response to each tenth input pulse it does not change the conductive condition of the buffer stage 14 because that pulse is of the wrong polarity to effect such a change. However, the next negative E pulse transferred over line 12 to RRU causes a positive pulse to be transferred over the lead 15 to the buffer stage from RRU and the buffer stage then transfers a negative carry pulse to RRT to advance it by a count of one.

The buffer stage 17 is energized over the lead 18 from the tens order RRT of the result register and the output of the buffer stage is transferred over a lead 19 to the hundreds order RRH to effect carry thereto. The buffer stage 17 functions in exactly the same manner as does buffer stage 14.

Carry between RRH and RRTh, RRTh and RRTTh, and RRTTh and RRHTh is conveyed over the leads 20, 21, and 22, respectively. No delay in the application of these carry pulses is necessary because the carry pulses constitute the sole input to these orders.

The multiplicand is entered into the result register a number of times equal to the value of the multiplier, the multiplicand being entered in the units, tens, and hundreds order of the result register in accumulator fashion. This is to say that the units, tens, and hundreds order respectively of the result register receive simultaneously a number of pulses equal to the units, tens, and hundreds digital values of the multiplicand during a single cycle of the multiplicand receiving device. The actual entry of the multiplicand to the result register is effected by the gates 23, 24, and 25. Positive E pulses are transferred continuously from the line 10E to these gates over leads 26, 27, and 28, respectively. The output of the gate 23 is transferred to RRU over a lead 29. The output of the gate 24 is transferred to RRT over lead 16 and the output of gate 25 is transferred to RRH over lead 19. The multiplicand receiving device controls the entry of pulses into the result register by effecting selective transfer of voltage over the leads 32, 33, and 34 to condition gates 23, 24 and 25, respectively, to respond to positive E pulses.

The gate 35, normally conditioned, is continuously supplied over a line 37 with positive F pulses from line 10F. These pulses render gate 35 momentarily conductive and negative pulses are transferred over lead 38 to the multiplicand receiving device Mc. However, these pulses have no effect upon Mc unless it is not in its initial stable condition whereupon a single pulse switches it to its initial stable condition. The gate 36, normally de-conditioned, is continuously supplied over a lead 40 with negative E pulses from the lead 10E. These pulses have no effect on gate 36 until it is conditioned and then allow it to effect pulse transfer over leads 39 and 38 to the multiplicand receiving device. Whether pulses transferred from gate 36 will effect the stable condition of the multiplicand receiving device depends upon the bias applied to the device over a lead 41.

The conditioning of gates 35 and 36 is controlled by the trigger Tmc which is normally in the Left condition. When the trigger Tmc is switched to the Right condition, gate 35 is de-conditioned by the voltage applied to it over lead 42. At the same time a voltage is applied over a lead 41 to the multiplicand receiving device to render it responsive to pulses from the gate 36 and a voltage is applied over lead 43 to the gate 36 to condition it.

After the multiplicand receiving device has completed its cycle of operation, a bias is applied over the lead 44 to the trigger Tmc which permits the trigger to be switched Left by the next negative F pulse applied to it over lead 10F.

The multiplier interpreter 47, triggers 48 and 49, calculate switch 50, and gate 51 comprise all the remaining blocks shown in Fig. 1.

Calculate switch 50 is operated to condition the system for operation and thereupon a pulse is transferred over a lead 52 to switch trigger 49 to the Right condition. At the same time a pulse is transferred over leads 52 and 53 to MpH to change the conductive condition of one of the digit-representing elements thereof. When another one of the digit-representing elements of MpH switches to one conductive condition, it causes a pulse to be transferred over leads 54 and 55 to the trigger 49 to switch it to the Left condition. At the same time, a pulse is transferred over leads 54 and 56 to the trigger 48, to switch it to the Left condition.

Trigger 49 is connected via a lead 57 to the gate 51 so that, when trigger 49 is switched to the Right condition gate 51 is conditioned and when trigger 49 is switched to the Left condition gate 51 is de-conditioned. After gate 51 is conditioned it is rendered conductive in response to the next positive D pulse appearing on the line 11D and thereupon gate 51 transfers a negative pulse over a lead 58 to MpU.

When trigger 48 is switched to the Right condition, as described hereinafter, a potential is transferred therefrom over a lead 59 to condition the gate 43 thereby rendering it responsive to positive C pulses from the circuit network 11.

The multiplier interpreter includes the circuits 60, 61, 62, and 63. The conductive condition of these circuits is dependent upon the condition of the multiplier receiving device Mp which is supplied with input entry pulses transferred over the lead 58 from the gate 51. As the last or lowest digit-representing element of MpU has been sequentially cycled a pulse is transferred over a lead 64 to MpT and over the leads 64 and 65 to one digit-representing element of MpU. Similarly a pulse is transferred from MpT over a lead 66 to MpH and over the leads 66 and 67 to one digit-representing element of MpT.

Each of the circuits of the multiplier interpreter 47 includes a grid-controlled tube. The circuits are inter-connected so that, when the tubes of circuits 60 and 62 are conductive, the tubes of buffer circuits 61 and 63 are non-conductive. Also, when the tubes of circuits 60 and 62 are non-conductive, the tubes of buffer circuits 61 and 63 are conductive. The latter is the normal condition of the circuits. A control electrode of the tube of circuit 62 is connected through a lead 68 to one side of digit-representing push-button switches (Fig. 3c) associated with the units order MpU of the multiplier receiving device Mp. A control electrode of the tube of circuit 60 is connected through a lead 69 to one side of digit-representing push-button switches (Fig. 3c) associated with the tens order MpT of the multiplier receiving device Mp. A control electrode of the circuit 60 is connected through a lead 70 to one side of the push buttons associated with the hundreds order MpH of the multiplier receiving device Mp. The tubes of circuits 60 and 62 become conductive when a number of pulses equal to the nine-hundred-ninety-ninth complement of the multiplier is applied to the multiplier receiving device. The resulting positive pulse transferred over a lead 71 from buffer circuit 63 to trigger 48 is ineffective to change the condition of the trigger because it is already in the Left condition. However, the next pulse applied to the multiplier receiving device Mp causes the tube of circuit 63 to become conductive. A negative pulse transferred over the lead 71 switches trigger 48 to the Right condition to cause the entry of the multiplicand into the result register in the manner set forth above. The trigger 48 is switched back to the Left condition in response to a pulse transferred to it over the leads 54 and 56 from MpH when the thousands pulse is applied to the multiplier receiving device Mp. Also a pulse is transferred from MpH over leads 54 and 55 to trigger 49 to switch it to the Left condition. When this occurs the multiplier is in its normal condition except that the product stands in the result register RR.

*Trigger circuit*

Fig. 2 shows a trigger T typical of the type employed in the invention. The trigger is shown as comprising a tube of the type having two triode tube sections with a common cathode in a single envelope. The left-hand tube section is designated L and the right-hand tube section is designated R. These sections are referred to herein as the tube L and tube R, respectively.

The tubes L and R are alternately conductive and non-conductive and vice versa. As stated hereinbefore, when the tube L is conductive the trigger is referred to as being in the Left condition, and when the tube R is conductive the trigger is referred to as being in the Right condition.

The common cathode of the tubes L and R is connected to ground line 72g. The plate of the tube L is connected through a resistor 73 to the high voltage line 74h and the plate of the tube R is connected through a resistor 75 to the line 74h. A lead 76 connects the plate of the tube R to the junction of resistor 75 and a voltage divider consisting of resistors 77 and 78 in series, the junction of the resistors 77 and 78 being connected to the control grid of the tube L. The lower end of resistor 78 is connected to cancel bias-line CBL and a capacitor 79 is connected in parallel with the resistor 77. Similarly, a lead 80 connects the plate of the tube L to the junction of resistor 73 and a voltage divider consisting of resistors 81 and 82 in series, the junction of resistors 81 and 82 being conected to the control grid of the tube R. The lower end of resistor 82 of this divider is connected to a bias-voltage line 83b. A capacitor 84 is connected in parallel with the resistor 81. The bias-voltage line 83b and the cancel-bias line CBL are connected together through cancel-bias switch CBS.

Switch CBS provides for quick resetting of the trigger to its initial stable condition. As shown, this initial condition is the Left condition. However, the connection of the lower end of resistor 82 to line CBL and the connection of the lower end of resistor 78 to the bias-voltage line 83b will cause the Right condition to be the initial condition.

As used herein, if the Left condition is the initial condition an $x$ is placed to the lower left of the tube L, and if the Right condition is the initial condition an $x$ is placed to the lower right of the tube R.

When switch CBS is opened, the grid-bias voltage applied to the tube L rises above the cutoff bias and this tube is rendered conductive irrespective of its condition immediately prior to the time when the switch was opened to disconnect line CBL from line 83b. The closing of switch CBS does not remove the positive bias voltage on the tube L but permits it to remain conductive so that the trigger is placed in the Left condition. The actual voltage at the control grid of the tube L is determined, among other things, by the voltage divider action of resistors 75, 77, and 78.

A single cancel-bias switch CBS is used to reset all of the triggers employed herein to their initial condition.

Terminal I is connected to the control grids of the tubes L and R through capacitors 85 and 86, respectively. The application to the terminal I of either positive or negative pulses of appropriate amplitude and duration will effect a change in the stable condition of the trigger circuit.

Since the trigger circuit employed is well known in the art, one cycle of its operation in response to negative pulses applied to terminal I will be described briefly. A similar cycle may be effected by the application of positive pulses.

When the first negative pulse is applied to the terminal I it is transferred to the control grids of the tubes L and R through the capacitors 85 and 86, respectively. This pulse has no direct effect on the tube R because its control grid is already biased below cutoff. However, this negative pulse decreases the bias on the control grid of the tube L and its plate voltage rises rapidly. This rising voltage is transferred from the plate of tube L through lead 80 and the parallel connected resistor 81 and capacitor 84 to the control grid of the tube R. The grid of tube R is thus made sufficiently positive to start conduction through that tube. The resulting decrease of the voltage at the plate of the tube R is transferred over the lead 76 and the parallel-connected resistor 77 and capacitor 79 to the control grid of the tube L to effect a further increase of the voltage at its plate. This increased voltage is again transferred to the control grid of the tube R to render it still more conductive. The resulting decreased voltage at the plate of the tube R is again transferred to the control grid of the tube L to render it still less conductive. This cumulative action is continued until tube L is rendered non-conductive and tube R is rendered uniformly conductive to place the trigger in the Right condition.

In a similar manner, the second negative pulse applied to the input terminal I decreases the voltage at the plate of the conducting tube R. This voltage is transferred to the control grid of the tube L to permit that tube to become conductive. The resulting decreased voltage at the plate of the tube L is transferred to the control grid of the tube R to render it still more conductive. The decreased voltage at the plate of the tube R is transferred to the control grid of the tube L to render it still less conductive. This cumulative action is continued until the tube R is rendered non-conductive and the tube L is rendered uniformly conductive to place the trigger in the Left condition.

While it has been explained that the trigger is switched from either stable condition to the other by the application of pulses to the terminal I, and hence to the grids of the tubes L and R simultaneously, it is understood that the trigger may be switched from one stable condition to the other by the application of a pulse to the control grid of only one tube or by any other conventional means such as plate or cathode keying.

In the schematic showing of Fig. 2*a* the trigger is designated as T as in Fig. 2. The terminals shown in Fig. 2*a* correspond to the similarly-designated terminals shown in Fig. 2. It should be noted that the absence of a connection to the terminal I in a schematic showing such as Fig. 2*a* indicates that capacitors 85 and 86 shown in Fig. 2 are omitted. A connection to the terminal I indicates that the trigger is switched from either stable condition to the other by the simultaneous application of pulses to the control grids of the tubes L and R. A connection to terminals C, P, *b*R, *b*L, *g*R, *p*L, P*r*L, *g*L, *p*R, and *pr*R indicates connection is made to the cathode of the tube T, the plate resistors 73 and 75, grid-bias resistor 78 of tube R, grid-bias resistor 82 of tube L, control grid of tube R, the plate of tube L, the plate resistor of tube L, the grid of tube L, the plate of tube R, and the plate resistor of tube R, respectively.

*Pulse sources*

The following description is best understood by arranging the drawings as illustrated by Fig. 3.

The oscillator 10 (Fig. 3*b*) includes dual type tube 90 having two triode sections referred to hereinafter as 90L and 90R. The common cathode of tubes 90L and 90R are connected to ground line 72*g* and the plates are connected through their respective resistors 92 to the high-voltage line 74*h*. The control grid of each tube is connected through a bias resistor 93 to line 72*g* and the grid of each tube is connected to the plate of the other through a capacitor 94. It is seen that these tubes are connected as a conventional multivibrator. Such a multivibrator is well known in the art and it suffices to state that the tubes 90L and 90R are alternately conductive and non-conductive and vice versa because of small differences in the characteristics of those tubes and the components used. This operation is continuous and causes positive and negative pulses to be produced at the plates of the tubes 90L and 90R. When the voltage at the plate of 90L is low the voltage at the plate of 90R is high and vice versa. Hence, the voltage pulses at these plates are alternately positive and negative and 180° out of phase.

The plate of the tube 90L is connected through a capacitor 95 to the control grid of amplifier tube 96E. The cathode of 96E is connected directly to line 72*g* and its plate connected through a resistor 97 to the line 74*h*. The control grid of tube 96E is connected through a bias resistor 98 to the line 72*g*. This amplifier may be of any suitable conventional design and serves only to amplifiy the pulses appearing at the plate of tube 90L. The pulses appearing at the plate of amplifier tube 96E are referred to herein as E pulses and are transferred over the line 10E.

A similar amplifier tube 96F is provided to amplify the voltage pulses appearing at the plate of the tube 90R. These pulses are transferred from the plate of tube 96F over line 10F to the circuit network 11 and to other circuits referred to hereinafter. The circuit network 11 has 4 triggers designated T1, T2, T4, and T8 connected in series chain to operate in binary fashion.

When in the starting or initial condition, of the triggers T1, T2, T4, and T8 is connected to be in the Left condition. Positive and negative F pulses are applied from the line 10F to the terminal I of trigger T1. However, trigger T1, as the remaining triggers, is responsive only to negative F pulses so that positive F pulses have no effect on the stable condition of the circuit. Terminal *pr*L in the plate resistor of the left tube of trigger T1 is connected over a line 99 to the terminal I of trigger T2 so that when trigger T1 is switched to the Left condition a negative pulse is transferred over lead 99 to the control grids of both tubes of the trigger T2 to effect a change in the stable condition of the trigger T2. In a like manner, trigger T2 is connected to trigger T4 and trigger T4 is connected to trigger T8. The operation of these triggers may be understood by reference to Table I below.

TABLE 1

*Circuit network 11*

| Input Pulse (−F) | Triggers | | | |
|---|---|---|---|---|
| | T1 | T2 | T4 | T8 |
| 0 | L | L | L | L |
| 1 | R | L | L | L |
| 2 | L | R | L | L |
| 3 | R | R | L | L |
| 4 | L | L | R | L |
| 5 | R | L | R | L |
| 6 | L | R | R | L |
| 7 | R | R | R | L |
| 8 | L | L | L | R |
| 9 | R | L | L | R |
| 10 | L | R | L | R |
| 11 | R | R | L | R |
| 12 | L | L | R | R |
| 13 | R | L | R | R |
| 14 | L | R | R | R |
| 15 | R | R | R | R |
| 16 (0) | L | L | L | L |

It is seen that the first input pulse (−F) applied to the terminal I of the trigger T1 causes that trigger to switch to the Right condition. As a result, a positive pulse is transferred over the line 99 to trigger T2 but does not effect the stable condition of T2 because, as stated, it is non-responsive to positive pulses. The second input pulse switches the trigger T1 to the Left condition and causes a negative pulse to be applied over the lead 99 to the trigger T2 to switch it to the Right condition. Similarly, the third input pulse switches the trigger T1 to the Right condition. The fourth input pulse switches trigger T1 to the Left condition which causes the trigger T2 to switch to the Left condition which causes the trigger T4 to switch to the Right condition. Normal binary operation is continued through the sixteenth input pulse. The sixteenth pulse completes a cycle of operation and leaves all triggers in the Left condition so that it corresponds to the zero or initial starting condition. Subsequent input pulses cause a repetition of this cycle of operation.

Figure 3A:
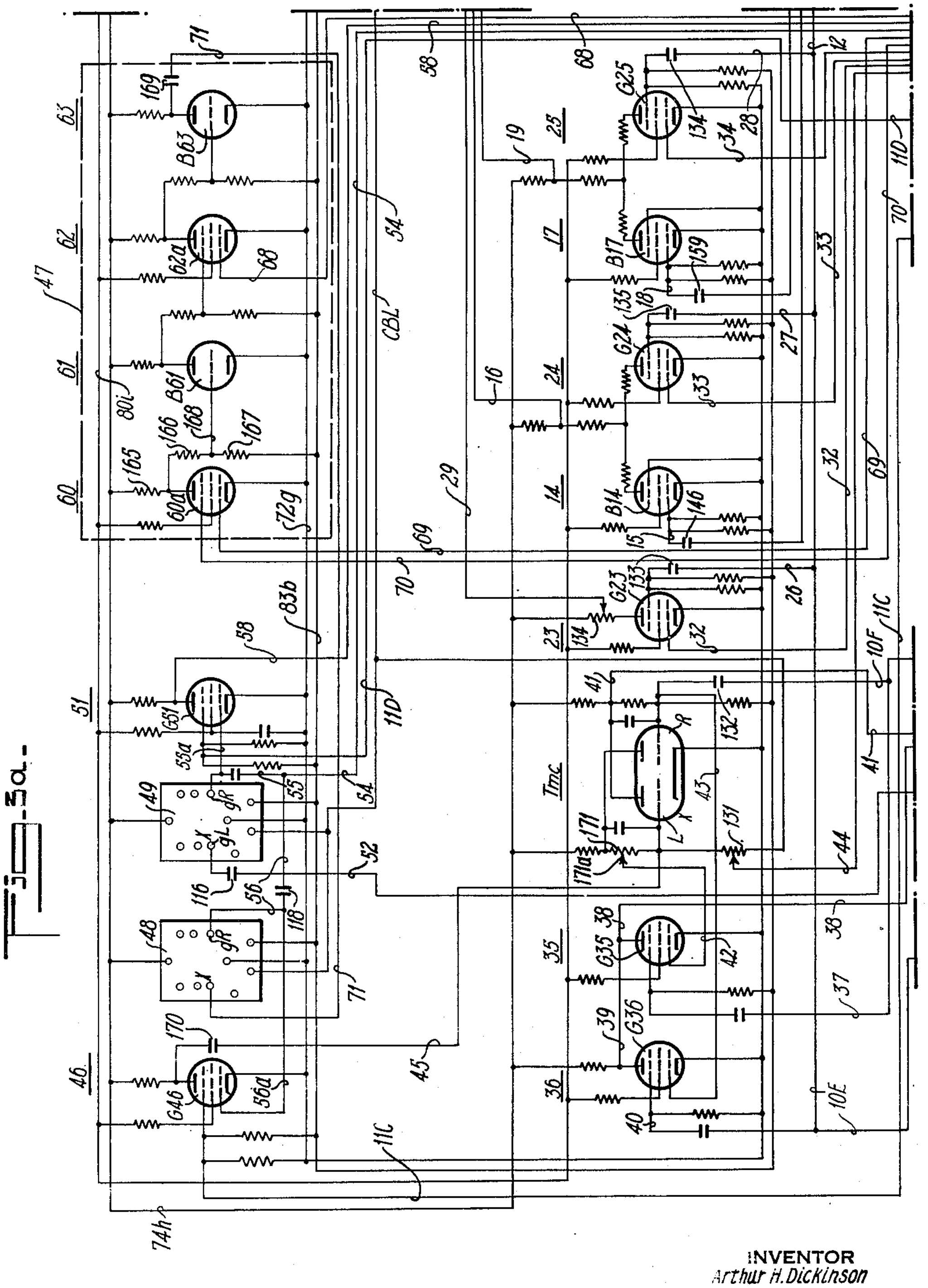

It is seen from Table I that the eighth input pulse causes the trigger T8 to switch to the Right condition. This switching causes a positive pulse to appear at the terminal *p*L and a negative pulse to appear at the terminal *pr*R. Terminal *p*L is connected through lead 11D and capacitor 100 to the suppressor grid of a tube G51 of gate 51 (Fig. 3*a*). As stated, the pulses transferred over this lead are referred to herein as D pulses, The tube G51 is so connected that when conditioned, this positive D pulse causes it to conduct. If it is not conditioned, the conductive condition of G51 is unaffected by a positive pulse. If a negative D pulse is impressed on the suppressor grid of G51, it will have no effect on the conductive condition of G51 whether it is conditioned or de-conditioned.

The terminal *pr*R of the trigger T8 is connected over lead 11C and capacitor 102 to the suppressor grid of tube G46 of gate 46 (Fig. 3*a*). As stated, the pulses transferred over this lead are referred to herein as C pulses. This negative C pulse has no effect on the conductive condition of tube G46 whether it is conditioned or de-conditioned. However, tube G46 is so connected that when conditioned, a positive pulse applied to its suppressor grid renders it conductive.

It should also be noted that the sixteenth input pulse applied to the terminal I of trigger T1 causes the trigger T8 to change from the Right to the Left condition. The negative D pulse has no effect on any other circuits. However, the positive C pulse transferred to the suppressor grid of tube G46 renders that tube conductive if it is in the conditioned status.

*Multiplier receiving device*

The units order M*p*U of the multiplier receiving device M*p* (Fig. 3*c*) includes ten digit-representing trigger elements M*p*UT9 to M*p*UT0, inclusive. In the initial starting condition each trigger is in the Left condition as shown. Input pulses are applied simultaneously from the lead 58 to the control grid of the tube L of the trigger M*p*UT9 and the control grids of the tube R of each of the triggers M*p*UT8–M*p*UT0. These pulses are transferred from lead 58 over a capacitor 104 and a lead 105 to the tube L of trigger M*p*UT9 and over a capacitor 104*a* and a lead 105*a* to the control grid of the tube R of each of the triggers M*p*UT8–M*p*UT0. The terminal *p*R of trigger M*p*UT9 is connected through a lead 106 and a capacitor 107 to the terminal *g*L of the trigger M*p*UT8. The terminal *p*L of M*p*UT8 is connected through a lead 108 and a capacitor 109 to the terminal *g*L of the trigger M*p*UT7. Likewise, the terminal *p*L of M*p*UT7 is connected to the terminal *g*L of the trigger M*p*UT6. In a like manner M*p*UT6 is connected to M*p*UT5, M*p*UT5 to M*p*UT4, M*p*UT4 to M*p*UT3, M*p*UT3 to M*p*UT2, M*p*UT2 to M*p*UT1, and M*p*UT1 to M*p*UT0.

The terminal *p*L of trigger M*p*UT0 is connected through the leads 64 and 65 and capacitor 110 to the terminal *g*R of the trigger M*p*UT9.

The tens order M*p*T of the multiplier receiving device also includes ten digit-representing triggers labelled M*p*TT9–M*p*TT0, inclusive. The connection of each trigger to the next lower digit-representing trigger is identical with that of the units order M*p*U. The terminal *p*L of the trigger M*p*TT0 is connected through the leads 66 and 67 and a capacitor 111 to the terminal *g*R of the trigger M*p*TT9. The lead 64 from the units order M*p*U is connected through a capacitor 112 to the terminal *g*L of the trigger M*p*TT9 and through a capacitor 112*a* to the terminal *g*R of each of the triggers M*p*TT8–M*p*TT0, inclusive.

The hundreds order M*p*H also includes ten digit-representing triggers M*p*HT9–M*p*HT0, inclusive. The higher digit-representing trigger is connected to the next lower digit-representing trigger exactly as the units and tens order triggers are connected. However, the terminal *p*L of the trigger M*p*HT0 is not connected to the trigger M*p*HT9 but is connected through a lead 54 to the leads 55 and 56 (Fig. 3*a*), the lead 55 being connected to the terminal *g*R of trigger 49 and to a lead 55*a* connected to the control grid of the tube G51 of gate 51, and the lead 56 being connected to the terminal *g*R of trigger 48 and to a lead 56*a* connected to the control grid of the tube G46 of the gate 46. All triggers in the units and tens order are so connected to the bias line 83*b* and the cancel-bias line CBL that the triggers are initially in the Left condition. In the hundreds order all triggers are similarly in the Left condition except the trigger M*p*HT9 which is connected so that it is initially in the Right condition.

When the calculate switch 50 (Fig. 3*b*) is closed, i. e. the switch blade contacts its upper terminal U and is brought back into contact with its lower terminal L by any suitable means such as a spring, a negative pulse is transferred over the lead 53 and through a capacitor 115 to the control grid of the terminal *g*R of trigger M*p*HT9. Since the tube R is conducting, this causes trigger M*p*HT9 to switch to the Left condition thereby placing all triggers in the multiplier receiving device in the Left condition. The closing of the calculate switch 50 also causes the trigger 49 to be switched to the Right condition and to thereby condition the gate tube G51 so that the next positive D pulse applied to its suppressor grid renders it conductive and causes a negative pulse to be transferred over the lead 58. This negative pulse appearing on lead 58 is applied simultaneously to the control grid of the tube L of the trigger M*p*UT9 and to the control grids of the tubes R of the remaining triggers of the units order. Since the tube L of the trigger M*p*UT9 is conductive and the remaining tubes R are non-conductive, only the conductive condition of the tube L of M*p*UT9 is effected. This causes the trigger M*p*UT9 to switch to the Right condition. When this occurs the voltage at the terminal *p*R thereof drops sharply and a negative pulse is transferred over the lead 106 and capacitor 107 to the control grid of the tube L of the trigger M*p*UT8. Since this tube is conductive, the trigger M*p*UT8 is switched to the Right condition. This first pulse has no further effect on any of the other triggers of the units order because the switching of the trigger M*p*UT8 to the Right condition causes the voltage at the terminal *p*L thereof to increase sharply so that a positive pulse is transferred over the lead 108 and capacitor 109 to the control grid of the tube L of trigger M*p*UT7. This pulse has no effect on the stable condition of M*p*UT7 since the tube L thereof was conductive when the pulse was applied to its grid. The next negative pulse transferred over the lead 58 is applied to the control grid of the conducting tube R of the trigger M*p*UT8 and switches it to the Left condition. When M*p*UT8 switches, the voltage at the terminal *p*L decreases sharply and a negative pulse is transferred over the lead 108 and capacitor 109 to the control grid of the conducting tube L of the trigger M*p*UT7. As a result, trigger M*p*UT7 is switched Right. The third negative pulse transferred by the lead 58 causes the trigger M*p*UT7 to switch to the Left condition and the trigger M*p*UT6 to switch to the Right condition. Successive negative pulses transferred by the lead 58 cause a similar sequential switching of the triggers. A cycle of such operation is illustrated by Table II wherein L designates the Left condition and R the Right condition of the respective triggers.

TABLE II

*Multiplier receiving device, units order MpU*

| Input Pulses (Lead 58) | Digit-Representing Triggers, M*p*UT9–M*p*UT0 | | | | | | | | | |
|---|---|---|---|---|---|---|---|---|---|---|
| | T9 | T8 | T7 | T6 | T5 | T4 | T3 | T2 | T1 | T0 |
| 0 | L | L | L | L | L | L | L | L | L | L |
| 1 | R | R | L | L | L | L | L | L | L | L |
| 2 | R | L | R | L | L | L | L | L | L | L |
| 3 | R | L | L | R | L | L | L | L | L | L |
| 4 | R | L | L | L | R | L | L | L | L | L |
| 5 | R | L | L | L | L | R | L | L | L | L |
| 6 | R | L | L | L | L | L | R | L | L | L |
| 7 | R | L | L | L | L | L | L | R | L | L |
| 8 | R | L | L | L | L | L | L | L | R | L |
| 9 | R | L | L | L | L | L | L | L | L | R |
| 10 | L | L | L | L | L | L | L | L | L | L |

It should be noted that the ninth negative input pulse causes the trigger M*p*UT1 to switch Left and causes the trigger M*p*UT0 to switch right. When trigger M*p*UT0 switches Right, the voltage at the terminal *p*L thereof rises sharply and a positive pulse is transferred over the leads 64 and 65 and capacitor 110 to the terminal *g*R of the trigger M*p*UT9. However, the tube R of M*p*UT9 is conductive and this pulse does not affect the stable condition of the trigger. This pulse is also transferred over the lead 64 to the terminal *g*L of the trigger M*p*TT9 and to the terminals *g*R of the triggers M*p*TT8–M*p*TT0, inclusive. This pulse, obviously, does not affect the stable condition of the already conducting tube L of the trigger M*p*TT9 and is of insufficient magnitude to cause a switching of any of the triggers *Mp*TT8–M*p*TT0, inclusive, although applied to the control grid of the non-conducting tubes R thereof.

When the tenth input pulse is applied over the lead 58 to the triggers of the units order M*p*U, it causes the trigger M*p*UT0 to switch to the Left condition. When this occurs, a negative pulse is applied over the leads 64 and 65 and the capacitor 110 to the control grid of the conducting tube R of the trigger M*p*UT9 and causes it to switch to the Left condition. As a result, a positive pulse is transferred over lead 106 and capacitor 107 to the control grid of the conducting tube L of the trigger M*p*UT9 and consequently it does not effect the stable condition of that trigger. This same negative pulse produced by the switching of trigger M*p*UT0 to the Left condition, is transferred by the lead 64 to the triggers of the tens order and causes the trigger M*p*TT9 to switch to the Right condition which causes the trigger M*p*TT8 to switch to the Right condition. The next negative pulse transferred by the lead 64 causes the trigger M*p*TT8 to switch to the Left condition which causes the trigger M*p*TT7 to switch to the Right condition. Subsequent pulses applied to the triggers of the tens order cause them to switch in the exact manner that the triggers of the units order M*p*U are switched. Hence, Table II is also applicable to a cycle of the tens order.

Figure 3B:
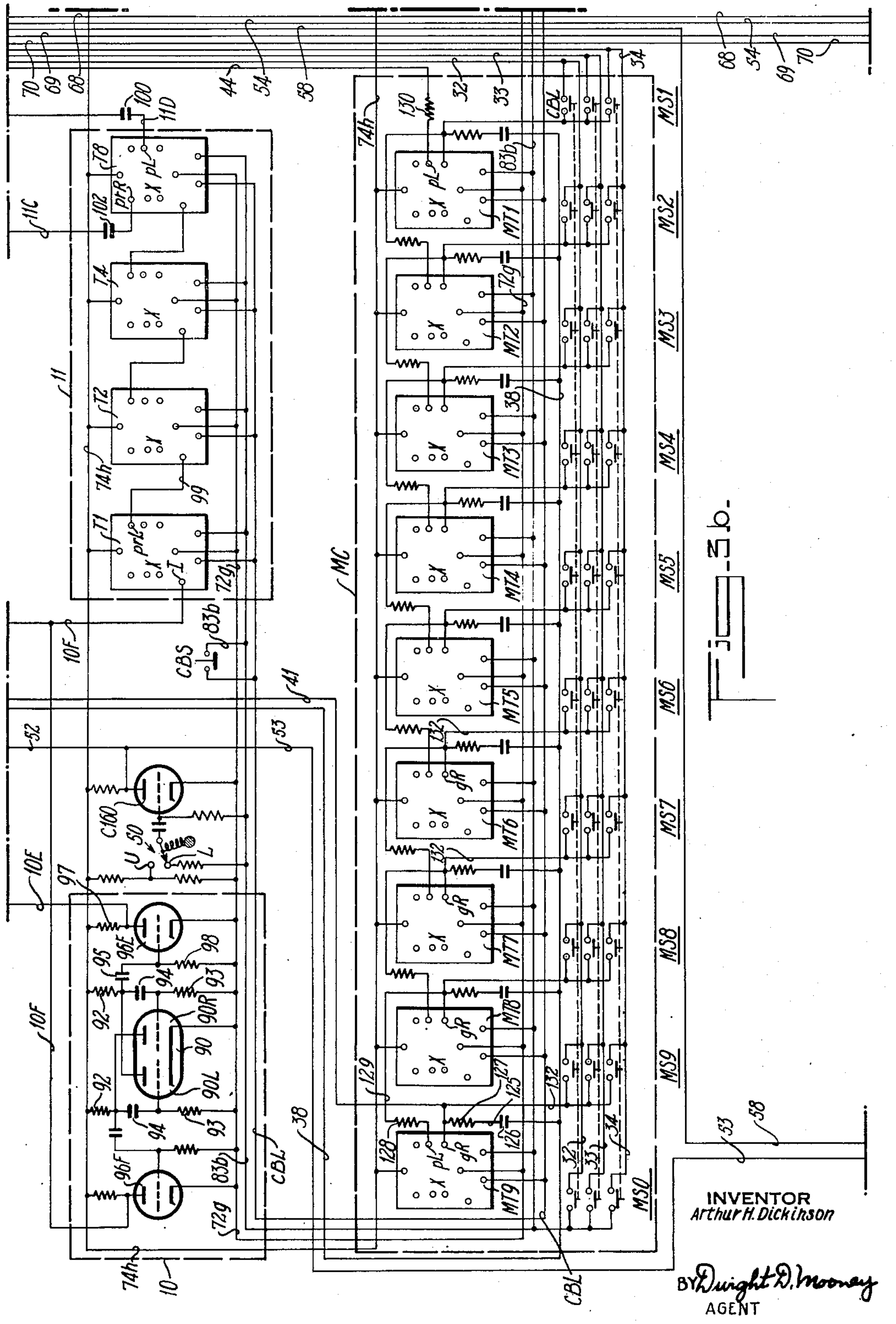
Figure 5C:
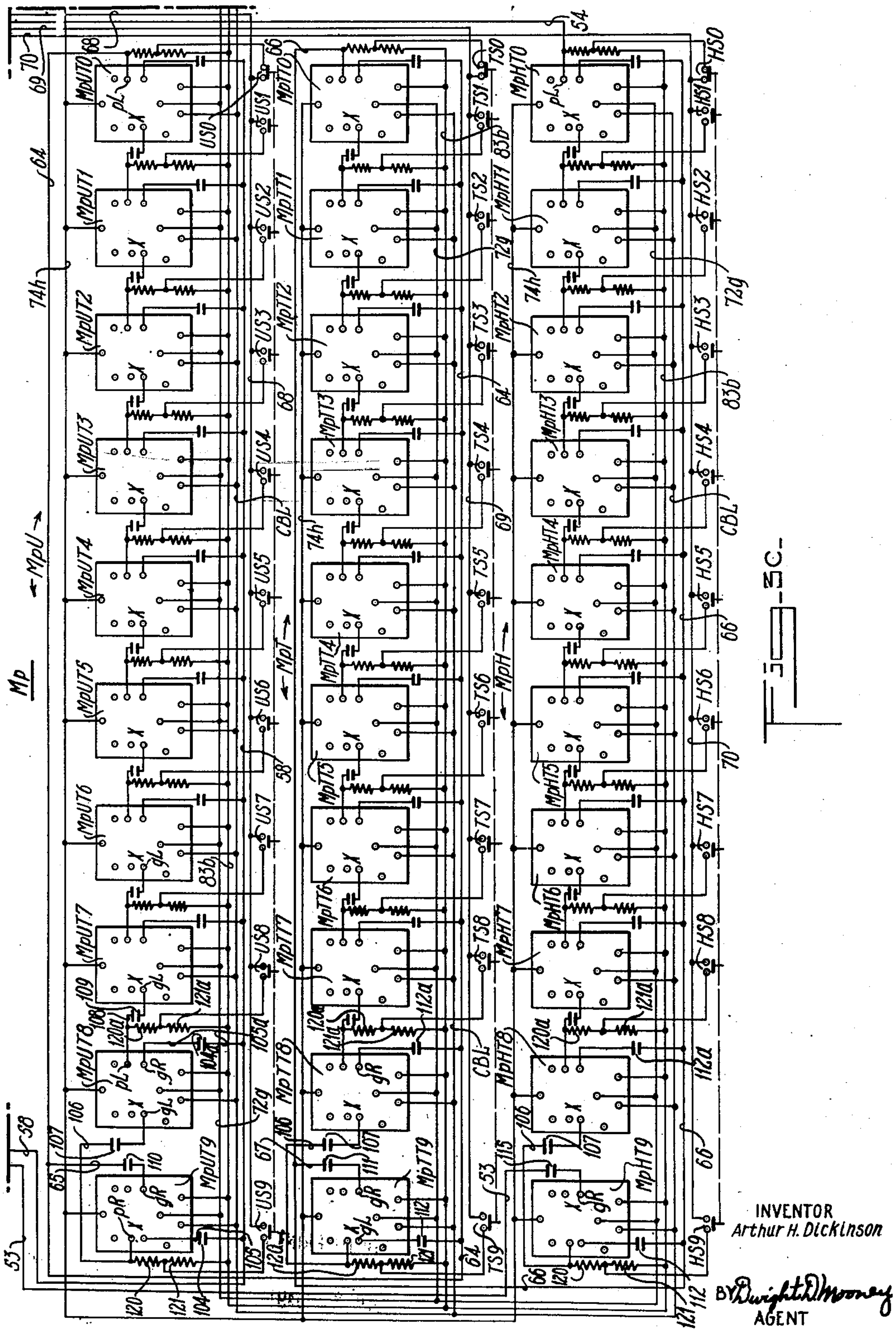

Each tenth input pulse applied to the tens order as a result of the switching of the trigger M*p*UT0 to the Left condition causes the trigger M*p*TT0 to switch to the Left condition and a negative pulse is transferred by the lead 66 to the triggers of the hundreds order M*p*H. The successive application of such pulses causes the hundreds order M*p*H to complete a cycle of operation exactly as shown in Table II for the units order. The first such pulse applied to M*p*H causes the trigger M*p*HT9 to switch to the Right condition which causes the trigger M*p*HT8 to switch to the Right condition. When the trigger M*p*HT9 is so switched, the increased voltage at the terminal *g*R is transferred over the capacitor 115 and leads 53 and 52 and a capacitor 116 to the terminal *g*L of trigger 49 which is in the Right condition (Figs. 3*b* and 3*a*). However, this positive pulse has no effect on the stable condition of the trigger 49 since it is substantially nonresponsive to positive pulses as compared to its response to negative pulses. It is seen that as a result of the transfer of the thousands pulse over the lead 58 to the triggers of the units order M*p*U the triggers M*p*UT0, M*p*TT0 and M*p*HT0, respectively, are switched to the Left condition and cause the triggers M*p*UT9 and M*p*TT9 to switch to the Left condition. When the trigger M*p*HT0 switches Left, the voltage at the terminal *p*L decreases sharply and a negative pulse is transferred over the leads 54 (Figs. 3*c*, 3*b*, and 3*a*) and 55 to the control grid of the conducting tube R (terminal *g*R) of the trigger 49, and over these same leads and lead **55*a* to the control grid of the tube G51. This same pulse is transferred from the leads 54 and 56 and a capacitor 118** to the control grid of the conducting tube R (terminal *g*R) of the trigger 48, and from the lead 54 over the lead 56, capacitor 118 and lead **56*a* to the control grid of the tube G46** (Fig. 3*a*). The application of this pulse causes the triggers 48 and 49 to switch to the Left condition. When trigger 48 so switches, it causes the tube G46 to be rendered non-conductive and the switching of the trigger 49 causes the tube G51 to be rendered non-conductive. This completes a multiplier receiving device cycle of operation and the circuit is in the condition which it was in before the calculate switch was closed.

Referring again to Fig. 3*c*, each order of the multiplier receiving device M*p* includes ten digit-representing push-button switches designated US9–US0, TS9–TS0 and HS9–HS0, inclusive, corresponding respectively to the digit-representing triggers M*p*UT9–M*p*UT0, M*p*TT9–M*p*TT0 and M*p*HT9–M*p*HT0, inclusive. Each switch US9 to US0 has a Left and a Right terminal.

The terminal *pR* of each of the triggers M*p*UT9, M*p*TT9 and M*p*HT9 is connected through resistors 120 and 121 to the bias-voltage line **83*b***. The terminals *p*L of each of the triggers M*p*UT8–M*p*UT0, M*p*TT8–M*p*TT0, and M*p*HT8–M*p*HT0, inclusive, is similarly connected through resistors **120*a* and 121*a*** to the bias-voltage line 63b. One terminal of each of the switches US9, TS9 and HS9 is connected intermediate the resistors 120 and 121 corresponding thereto and one terminal of each of the switches US8–US0, TS8–TS0, and HS8–HS0, inclusive, is connected intermediate the resistors 120a and 121a corresponding thereto. The other terminal of the switches US9–US0, inclusive, is connected to the lead 68. The other terminal of the switches TS9–TS0, inclusive, is connected to the lead 69 and the other terminal of the switches HS9–HS0, inclusive, is connected to the lead 70.

The switches of each order are ganged as indicated by the dotted line joining them. These switches are so arranged that only one button may engage its associated terminals at any one time and the depressing of any button causes any other depressed button to disengage its associated terminals.

In order to enter the multiplier, the push button corresponding to the particular digital value of the multiplier is depressed. For example, if it is desired to enter the multiplier 686, the button of switch US6 is depressed, the button of switch TS8 is depressed, and the button of switch HS6 is depressed. It is seen from the circuit arrangement that when each of the triggers *MpUT6*, *MpTT8* and *MpHT6* is switched to the Right condition, a positive voltage is transferred to the corresponding lead 68, 69, and 70, respectively. Considering the units order *MpU*, the trigger *MpUT6* is switched Right when the third input pulse is transferred over the lead 68 to the triggers of *MpU*. In other words, a positive voltage is always transferred over the lead 68 when a number of input pulses have been applied to the units order, which number of pulses is equal to the nines complement of the units digit of the multiplier. When such a voltage is transferred to the lead 68, it is transferred by that lead to the control grid of the tube 62*a* (Fig. 3*a*) to condition that tube to be conductive when its suppressor grid is rendered sufficiently positive. Similarly a positive voltage is transferred to the lead 69 when a number of pulses are transferred from the units order *MpU* to the tens order *MpT*, which number of pulses is equal to the nines complement of the tens digit of the multiplier. This positive voltage on the lead 69 is transferred to the control grid of the tube 60*a* of the multiplier interpreter unit 47 (Fig. 3*a*) so that the tube 60*a* is rendered conductive when its suppressor grid has a sufficiently positive voltage applied thereto.

Likewise, a positive voltage is transferred to the lead 70 when a number of input pulses equal to the nines complement of the hundreds digit of the multiplier is applied from the tens order *MpT* to the hundreds order *MpH*. This voltage is transferred from the lead 70 to the suppressor grid of the tube 60*a* to cause that tube to become conductive if the voltage on its control grid is sufficiently positive.

The pulses transferred from the multiplier receiving device over the leads 68, 69, and 70 to the tubes 60*a* and 62*a* control the conductive condition of those tubes and hence of the multiplier interpreter 47 (Fig. 3*a*) in such manner as to effect the switching of the trigger 48 to the Right condition which controls the conditioning of the tube G46 which controls trigger T*mc* which determines the entry of the multiplicand into the multiplicand receiving device M*c*. This operation will be described in detail hereinafter.

*Multiplicand receiving device*

Referring now to Fig. 3*b* the multiplicand receiving device M*c* includes nine digit-representing trigger circuits MT9–MT1, inclusive. Each of these trigger circuits is initially in the Left condition and is connected in series chain to be sequentially switchable to the Right condition in response to successive positive pulses applied simultaneously to the control grid of the tube R of each trigger. These positive pulses are conveyed to the control grids of the tubes R over the leads 38 and 125, the capacitors 126, and the resistors 127. Such pulses are not sufficient to cause a switching of the stable condition of any trigger unless it has previously been properly biased.

To initiate the sequential switching of the triggers, a positive bias is supplied over the lead 41 to the control grid of the tube R of trigger MT9. When such occurs, the next positive pulse transferred by the lead 38 to the terminals *g*R of the triggers MT9–MT1, inclusive, causes a sufficient voltage increase at the control grid of the tube R of the trigger MT9 to switch it to the Right condition. This causes a voltage increase at the terminal *p*L of MT9 which voltage is transferred over a resistor 128 and a lead 129 to the control grid (terminal *g*R) of the tube R of the trigger MT8 to supply a steady positive voltage bias to it. This first positive pulse transferred by the lead 38 has no effect on the stable condition of any of the other triggers because it is of insufficient magnitude to render the tubes R of those triggers conductive to initiate a switching in their stable condition. In a similar manner, the next positive pulse transferred by the lead 38 causes the trigger MT8 to switch to the Right condition which in turn causes a positive bias to be applied to the terminal *g*R of the trigger MT7. In a similar manner, subsequent positive pulses transferred over the lead 38 cause the triggers MT7–MT1, inclusive, to be switched to the Right condition. The sequential switching of the triggers is illustrated by Table III wherein L represents that the particular trigger is in the Left condition and R indicates that the particular trigger is in the Right condition.

TABLE III

*Multiplicand receiving device*

| Input Pulses (Lead 38) | Digit-Representing Triggers | | | | | | | | |
|---|---|---|---|---|---|---|---|---|---|
| | MT9 | MT8 | MT7 | MT6 | MT5 | MT4 | MT3 | MT2 | MT1 |
| 0 | L | L | L | L | L | L | L | L | L |
| 1 | R | L | L | L | L | L | L | L | L |
| 2 | R | R | L | L | L | L | L | L | L |
| 3 | R | R | R | L | L | L | L | L | L |
| 4 | R | R | R | R | L | L | L | L | L |
| 5 | R | R | R | R | R | L | L | L | L |
| 6 | R | R | R | R | R | R | L | L | L |
| 7 | R | R | R | R | R | R | R | L | L |
| 8 | R | R | R | R | R | R | R | R | L |
| 9 | R | R | R | R | R | R | R | R | R |

Normally the multiplicand receiving device M*c* receives negative pulses from the tube G35 (Fig. 3*a*), these negative pulses being transferred over the lead 38 and applied to the triggers of the device in the same manner as the positive pulses used to effect the sequential switching thereof. Since these negative pulses are applied to the control grid of the tube R of each trigger, they are effective only to switch any triggers to the Left condition which are in the Rright condition. A single negative pulse is thus effective to switch simultaneously such triggers to the Left condition.

To initiate the sequential switching of the triggers in response to positive pulses, the trigger T*mc* (Fig. 3*a*) is switched to the Right condition in response to a positive C pulse momentarily rendering the tube G46 (Fig. 3*a*) conductive. When the trigger T*mc* switches Right, a positive bias is applied over the lead 41 to the control grid of the tube R of the trigger MT9.

It is seen from Table III that the ninth positive input pulse to the multiplicand receiving device M*c* switches the trigger MT1 to the Right condition. As a result, the voltage at the terminal *p*L thereof is increased. This increased voltage is transferred over a resistor 130 and the lead 44 to a control-grid-bias potentiometer 131 connected to the control grid of the tube L of the trigger T*mc* (Fig. 3*a*). As a result the next negative F pulse applied through the lead 10F and a capacitor 132 to the control grid of the tube R of trigger T*mc* causes that trigger to switch to the Left condition. When T*mc* switches Left, it conditions tube G35 and de-conditions tube G36. The next positive F pulse causes the tube G35 to be rendered momentarily conductive to transfer a negative pulse over the lead 38 to the triggers of the device to effect a simultaneous switching of them to the Left condition.

Figure 3D:
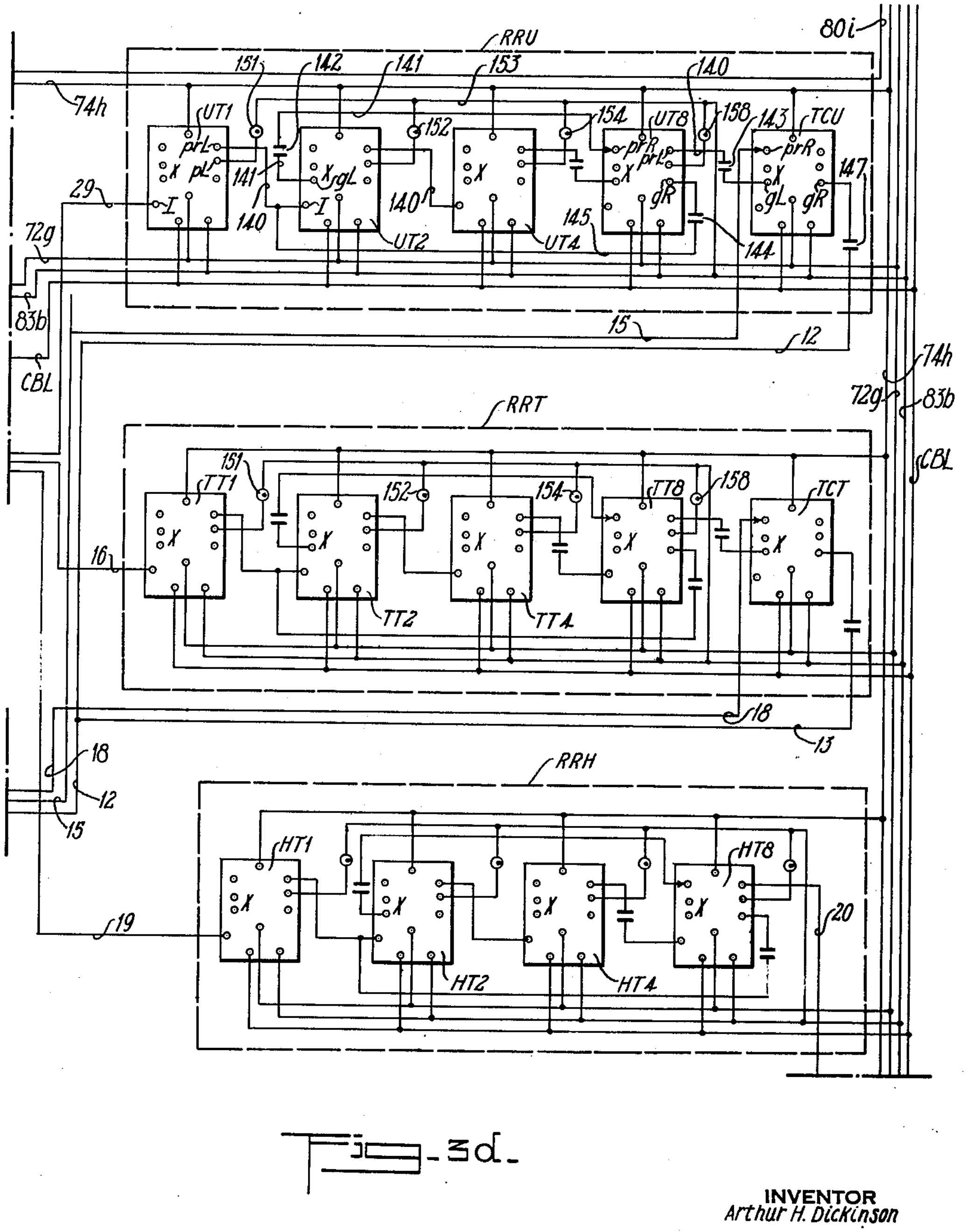

The novel multiplicand receiving device includes ten digit-representing switches, MS0, MS9, MS8, MS7, MS6, MS5, MS4, MS3, MS2, and MS1 for each order of the multiplicand. All switches of the units order, indicated by "units" to the left of MS0, are ganged as indicated by the dotted line as are the switches of the tens and hundreds order indicated by "tens" and "hundreds" to the left of MS0. These digit-representing switches are identical with those described in connection with the multiplier receiving device M*p*. One terminal of each of the switches representing the same digital value in each order is commonly connected to the control grid of the tube R of the trigger representing the same digital value, e. g., the left-hand terminals of the switches MS9 are connected together and to the tube R of the trigger MT9 and so forth. Each of the switches MS0 has one of its terminals connected to the bias-voltage line 83*b*. The other terminal of each of the switches representing the digits of the units order is connected to the lead 32 which is connected at its other end to the control grid of the tube G23 (Fig. 3*a*) of gate 23. Each of the switches representing the tens order has its other terminal connected to the lead 33, connected at its other end to the control grid of the tube G24 (Fig. 3*a*) of gate 24, and each of the switches representing a digit of the hundreds order has its other terminal connected to the lead 34, connected at its other end to the control grid of tube G25 (Fig. 3*a*) of gate 25. To enter the multiplicand, the push button of the switch of each order corresponding to that digit of the multiplicand is depressed. To illustrate, if the multiplicant is 967, the push button corresponding to the switch MS7 of the units order is depressed, the push button corresponding to the switch MS6 of the tens order is depressed, and the push button corresponding to the switch MS9 of the hundreds order is depressed. As seen from Table III and pointed out above, the first positive input pulse transferred over the lead 38 causes the trigger MT9 to switch to the Right condition. When this occurs the increased voltage at the control grid of the tube R of the trigger MT9 is transferred from the terminal *g*R thereof over a lead 132, the switch MS9 of the hundreds order, and the lead 34 to the control grid of the tube G25 (Fig. 3*a*) to condition the tube G25 to be responsive to the next positive E pulse transferred over the leads 10E and 28 and a capacitor 134 to its suppressor grid. The resulting decreased voltage at the plate load resistor of the tube G25 is transferred over a lead 19 to the hundreds order of the result register (Fig. 3*d*). In a similar manner successive positive E pulses cause a negative pulse to be transferred to the hundreds order of the result register. Since negative E pulses cause the sequential switching of the triggers of the multiplicand receiving device to the Right condition, eight negative pulse entries will be transferred to the hundreds order of the result register before the ninth pulse causes trigger MT1 to be switched to the Right condition. As explained above, the switching of MT1 to the Right condition causes the trigger T*mc* (Fig. 3*a*) to be switched to the Left condition by the next negative F pulse. Occurring simultaneously with this negative F pulse is a positive E pulse which again causes the tube G25 to conduct and transfer a ninth entry to the result register. The switching of the trigger T*mc* conditions G35 (Fig. 3*a*) and de-conditions G36 (Fig. 3*a*) allowing the next positive F pulse to effect the transfer of a negative pulse over the lead 38 to switch all the triggers of the multiplicand receiving device to the Left condition and thereby remove the positive bias on the control grid of the tube G25 to recondition G25 and prevent the transfer of any subsequent entries in response to the positive E pulses applied to its suppressor grid. Hence, the depressing of the switch MS9 of the hundreds order of the multiplicand receiving device has resulted in the transfer of nine entries into the hundreds order of the result register, eight of these entries being transferred while the digit-representing triggers of the device were being sequentially switched to the Right condition and the ninth entry being transferred at the same time that the disabling of the transferring circuit (tube G23) was initiated by the switching of T*mc* to the Right condition.

In a similar manner, the switching of trigger MT7 to the Right condition transfers a positive bias voltage from the terminal *g*R thereof over the lead 132, the switch MS7 of the units order, and the lead 32 to the control grid of the tube G23 (Fig. 3*a*) to condition it to respond to the next positive E pulse transferred over the leads 10E and 26, and a capacitor 133 to its suppressor. The next positive E pulse applied to this suppressor grid causes a negative voltage to be transferred over the lead 29 to the units order of the result register (Fig. 3*d*). In a similar manner, six more entries are made into the units order of the result register before the tube G23 is de-conditioned by the trigger MT7 being switched to the Left condition by the negative pulse transferred over the lead 38.

Likewise, when the trigger MT6 is sequentially switched to the Right condition, the increased voltage at the terminal *g*R is transferred therefrom over the lead 132, the switch MS6 of the tens order, and lead 33 to the control grid of the tube G24 to condition it to be rendered conductive in response to subsequent positive E pulses transferred over the leads 10E and 27 and the capacitor 135 to its suppressor grid. A resulting momentary decreased potential in the plate circuit of tube G24 is transferred over a lead 16 to the tens order of the result register (Fig. 3*d*). In a manner similar to that explained in connection with the units entries into the result register, six entries are made into the tens order of the result register (Fig. 3*d*) before a negative pulse is transferred over the lead 38 to the triggers of the multiplicand receiving device to switch them simultaneously to the Left condition and thereby de-condition the tube G24 (Fig. 3*a*).

If any of the push buttons of switch MS0 is depressed it will not effect pulse transfer into the result register since it will transfer a negative voltage to the control grid of the corresponding gate tube and thereby prevent its conduction.

In the novel manner described above, the units, tens, and hundreds digital entries corresponding to the respective values of the corresponding multiplicand digit are simultaneously made into the result register in accumulator fashion.

*Result register*

Figure 3E:
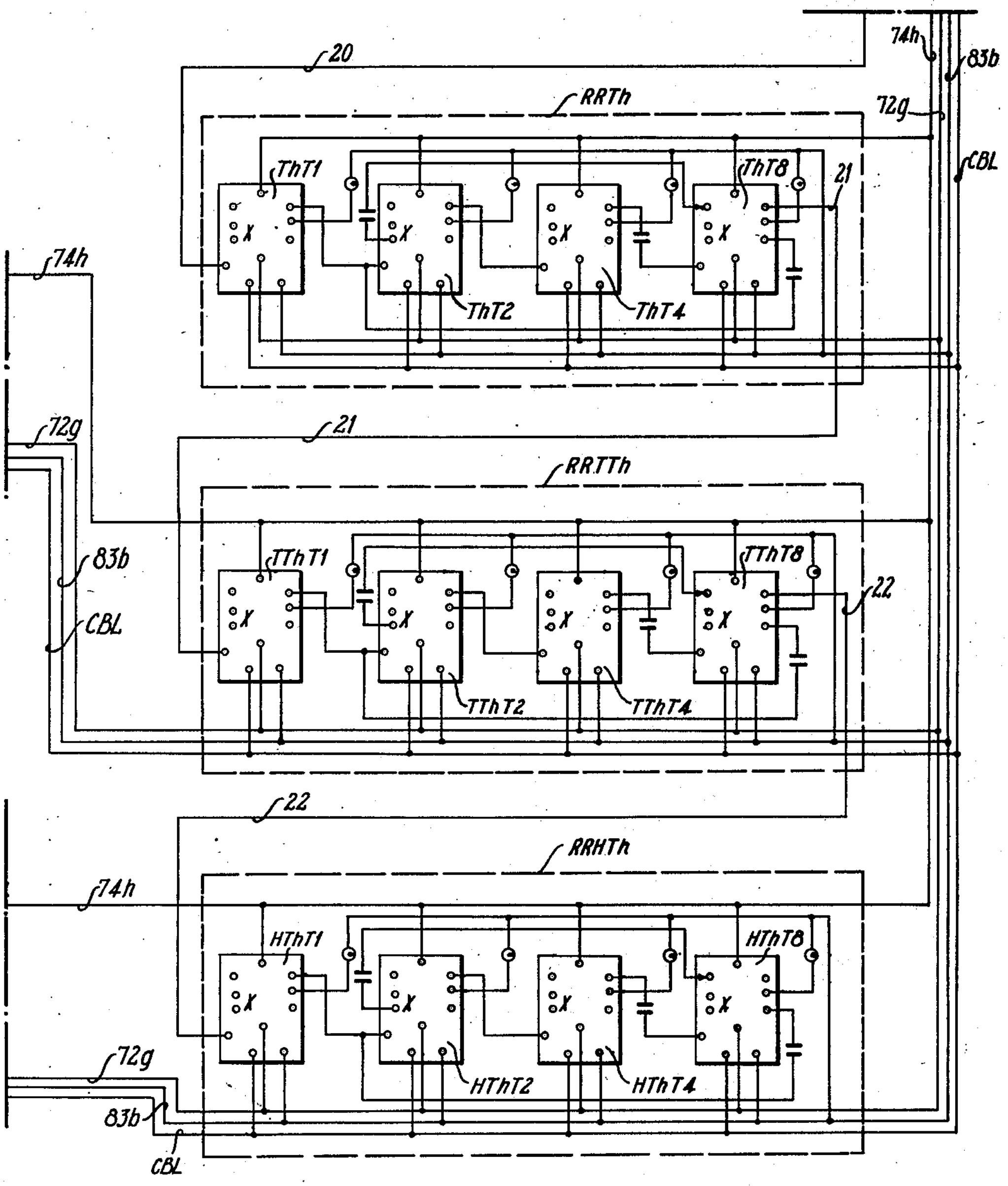
Figure 4A:
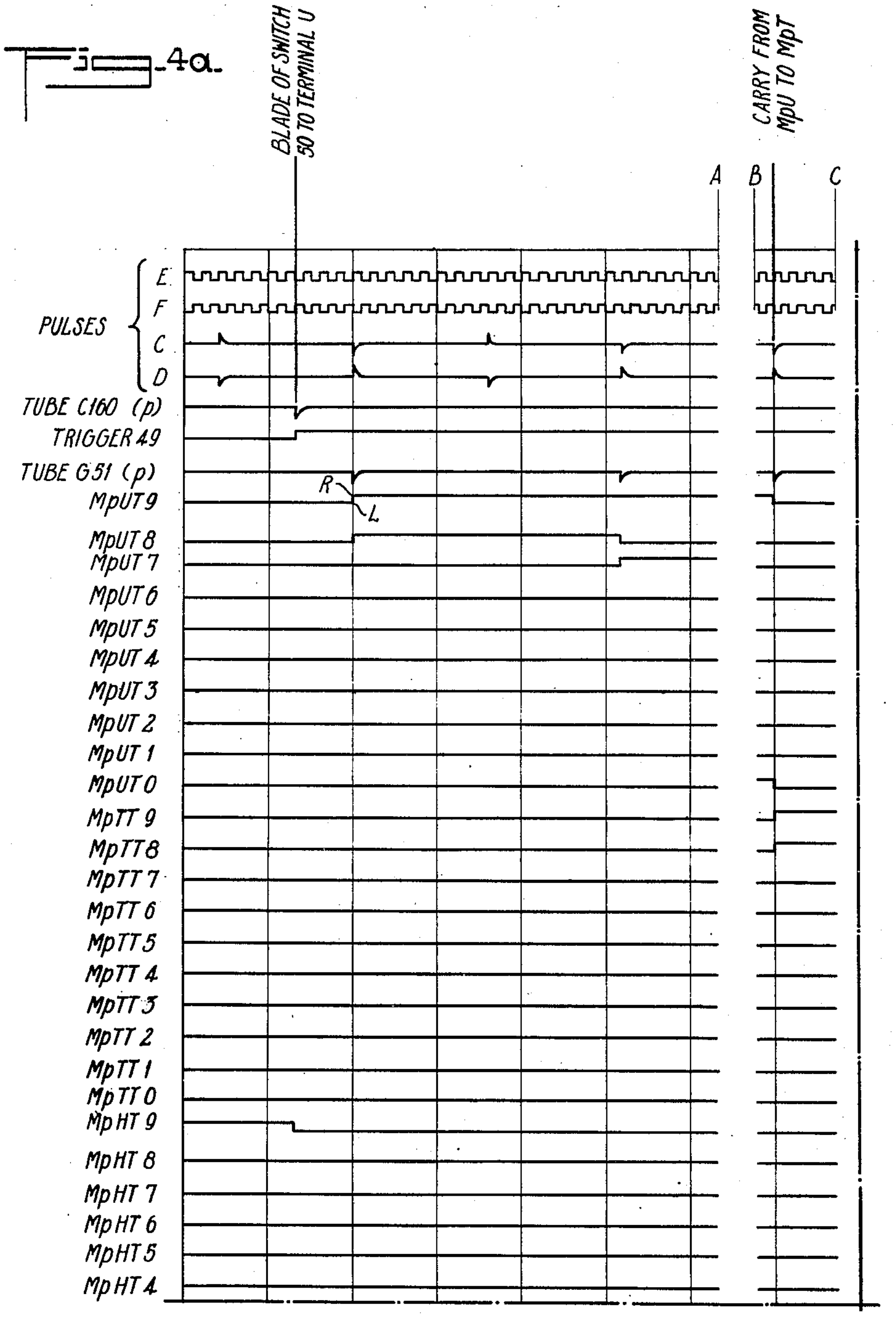
Figure 4B:
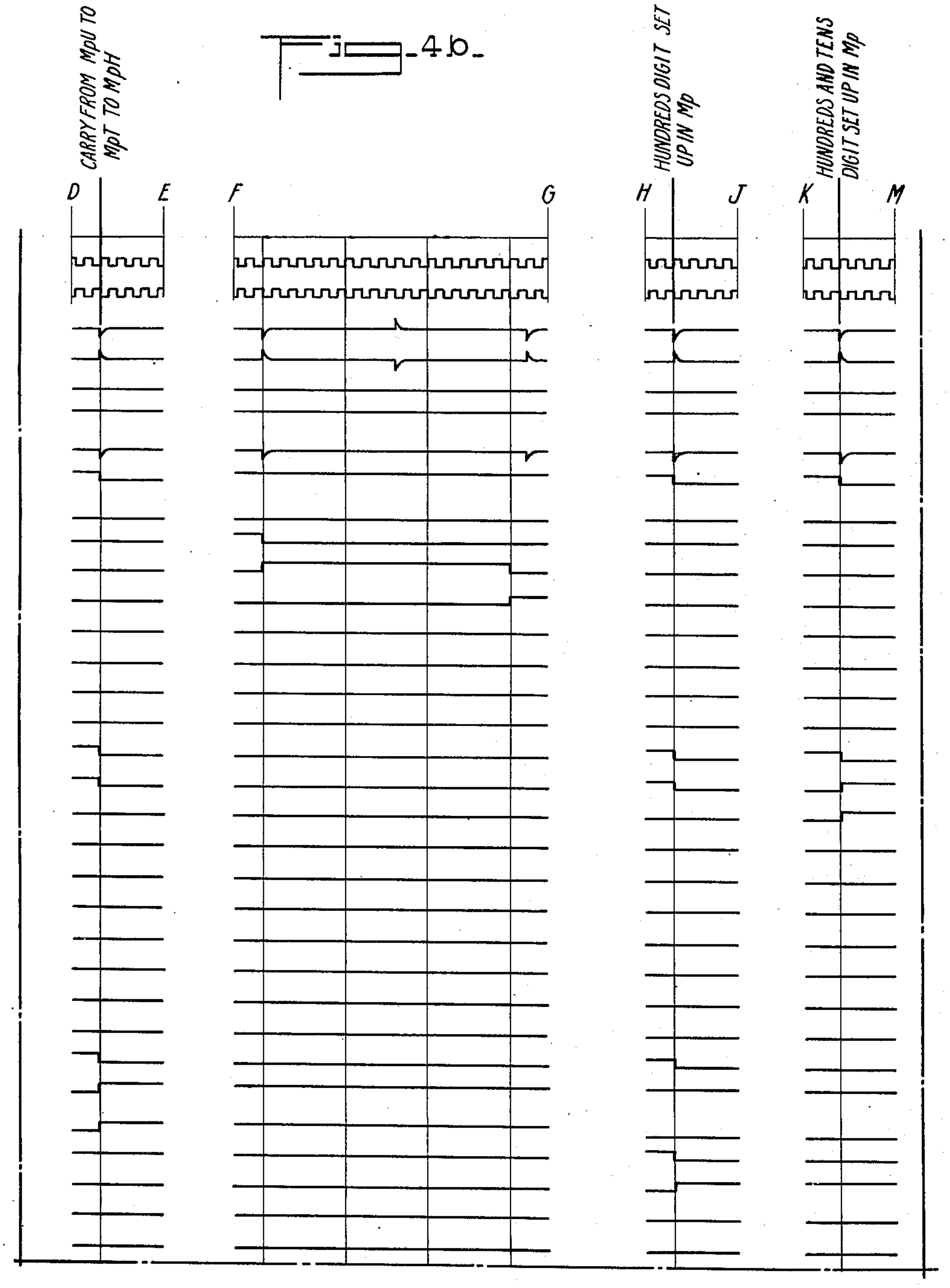
Figure 4C:
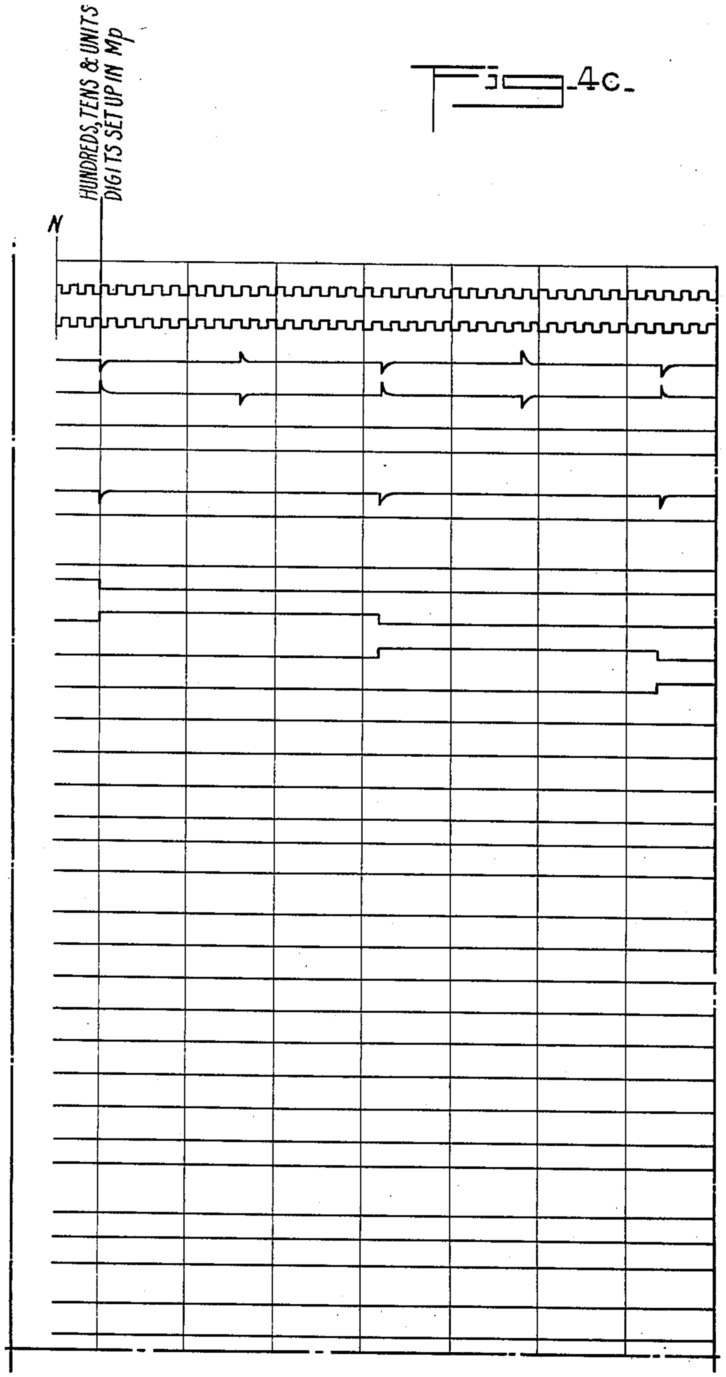
Figure 4D:
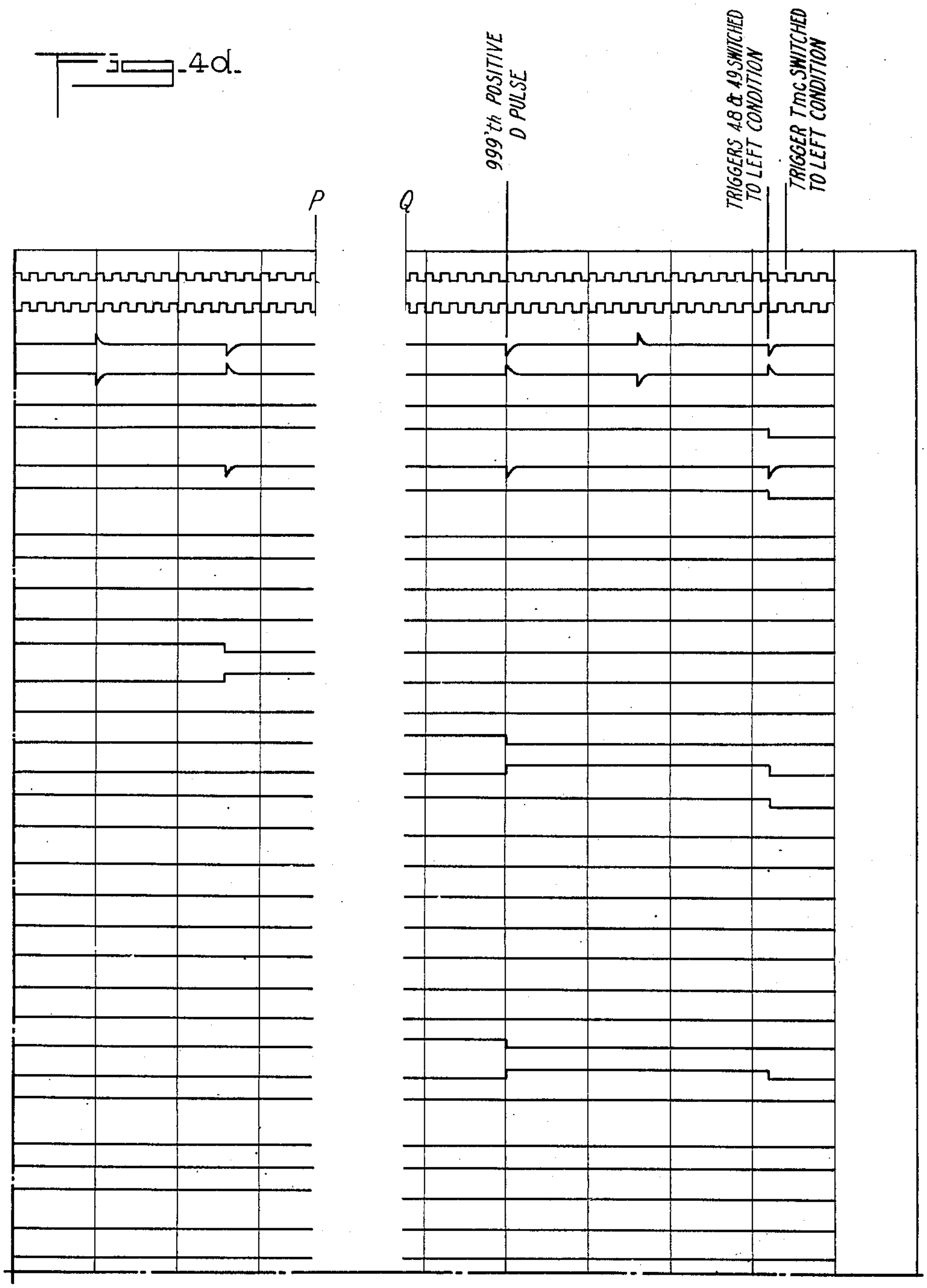
Figure 4E:
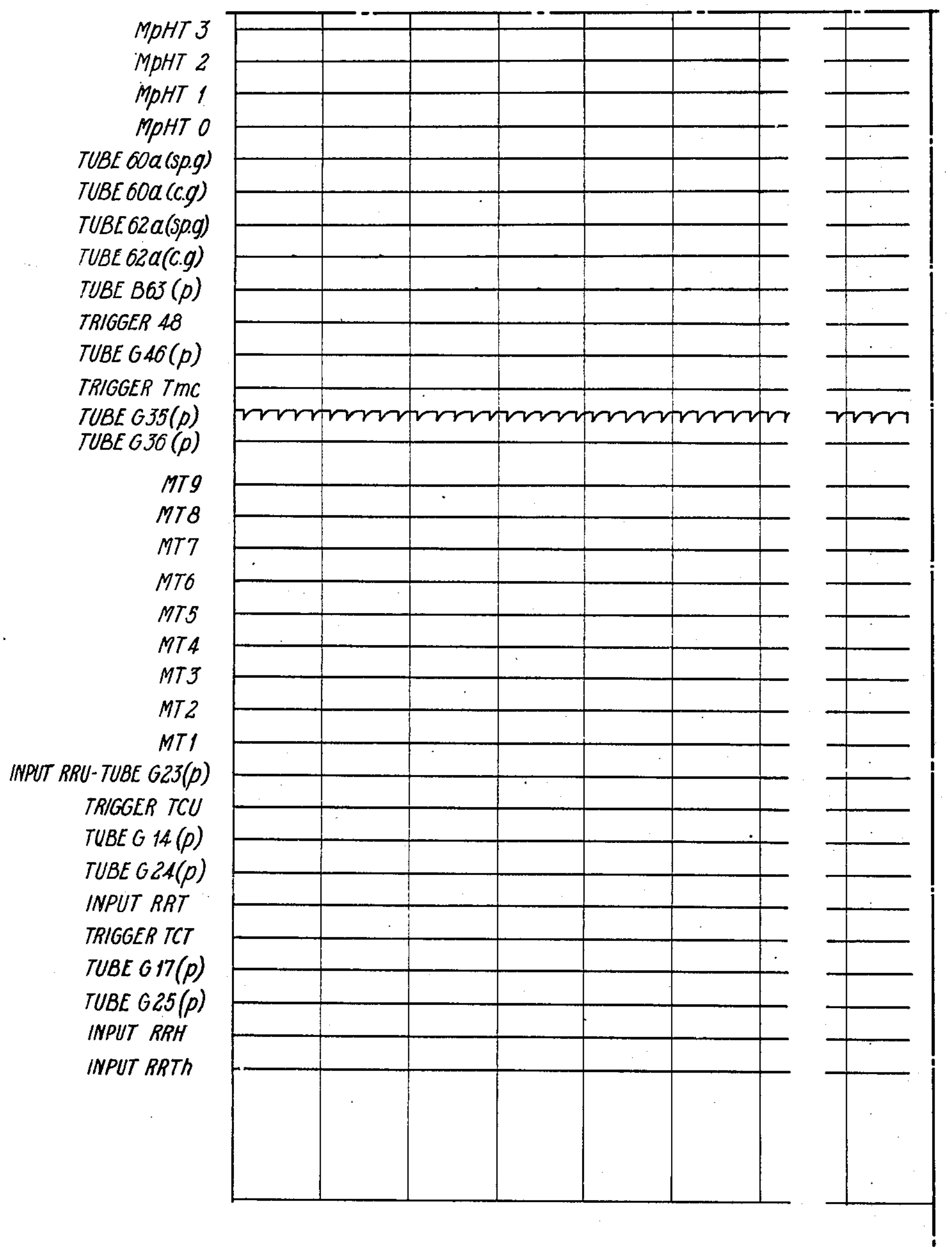
Figure 4F:
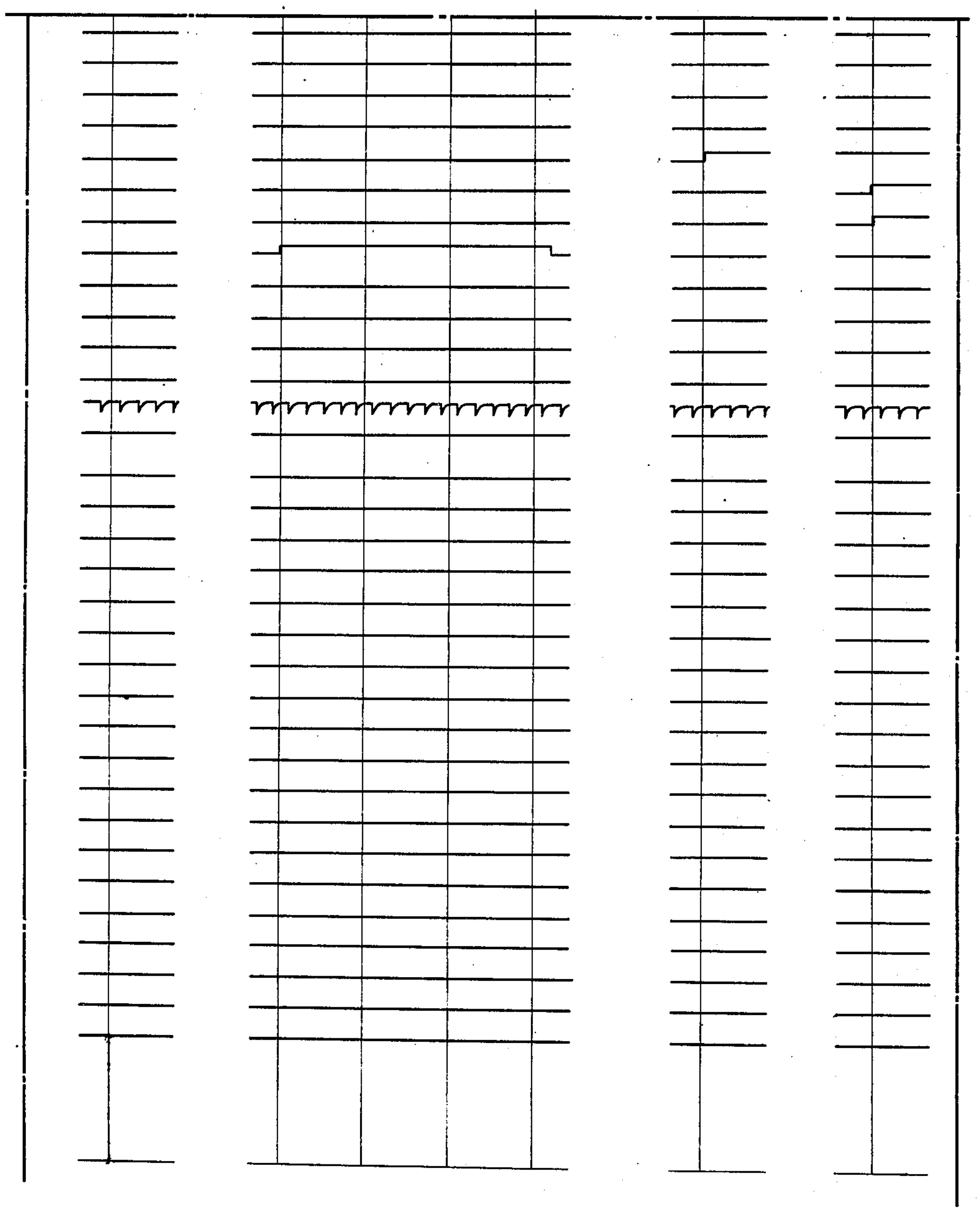
Figure 4G:
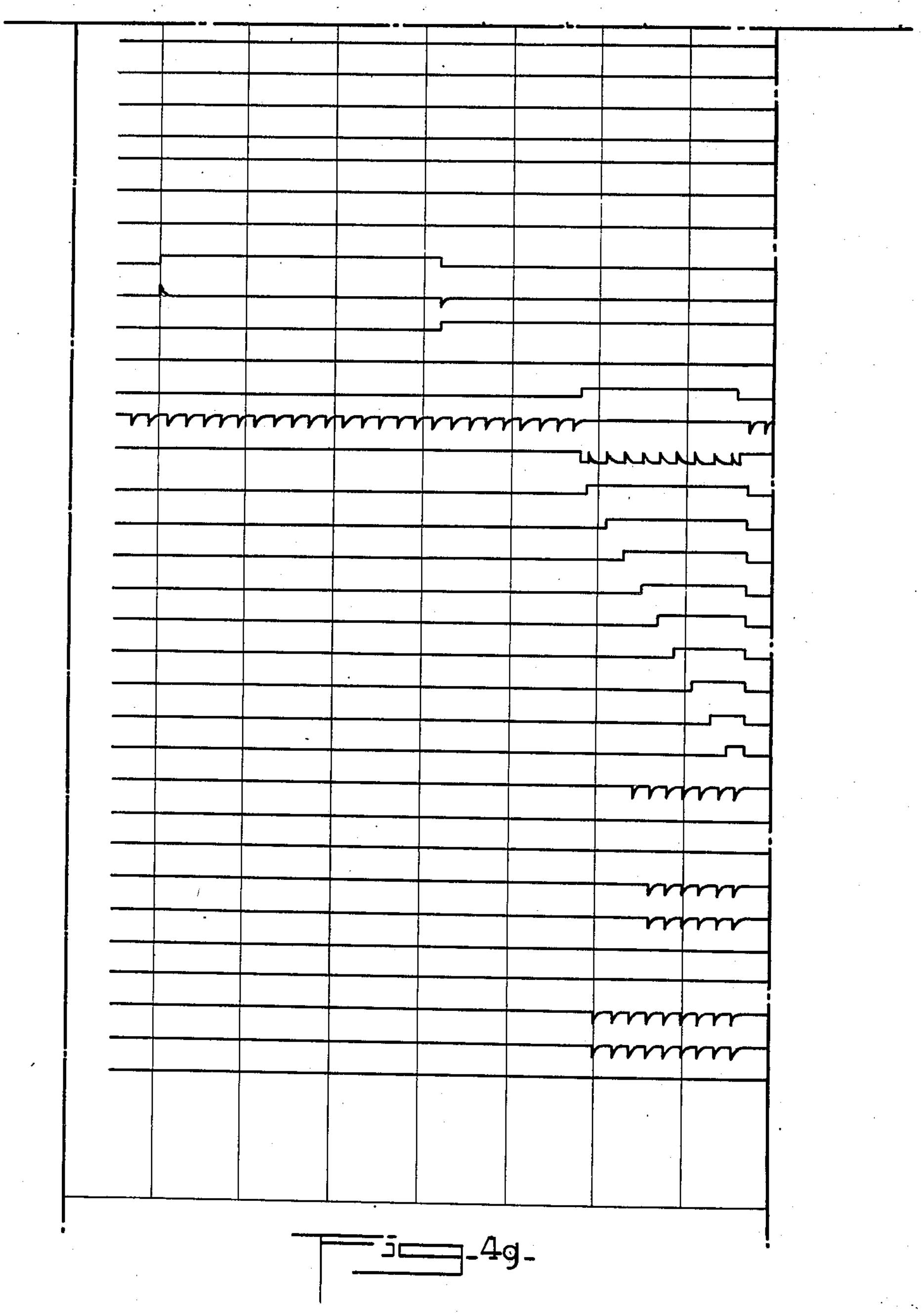
Figure 4H:
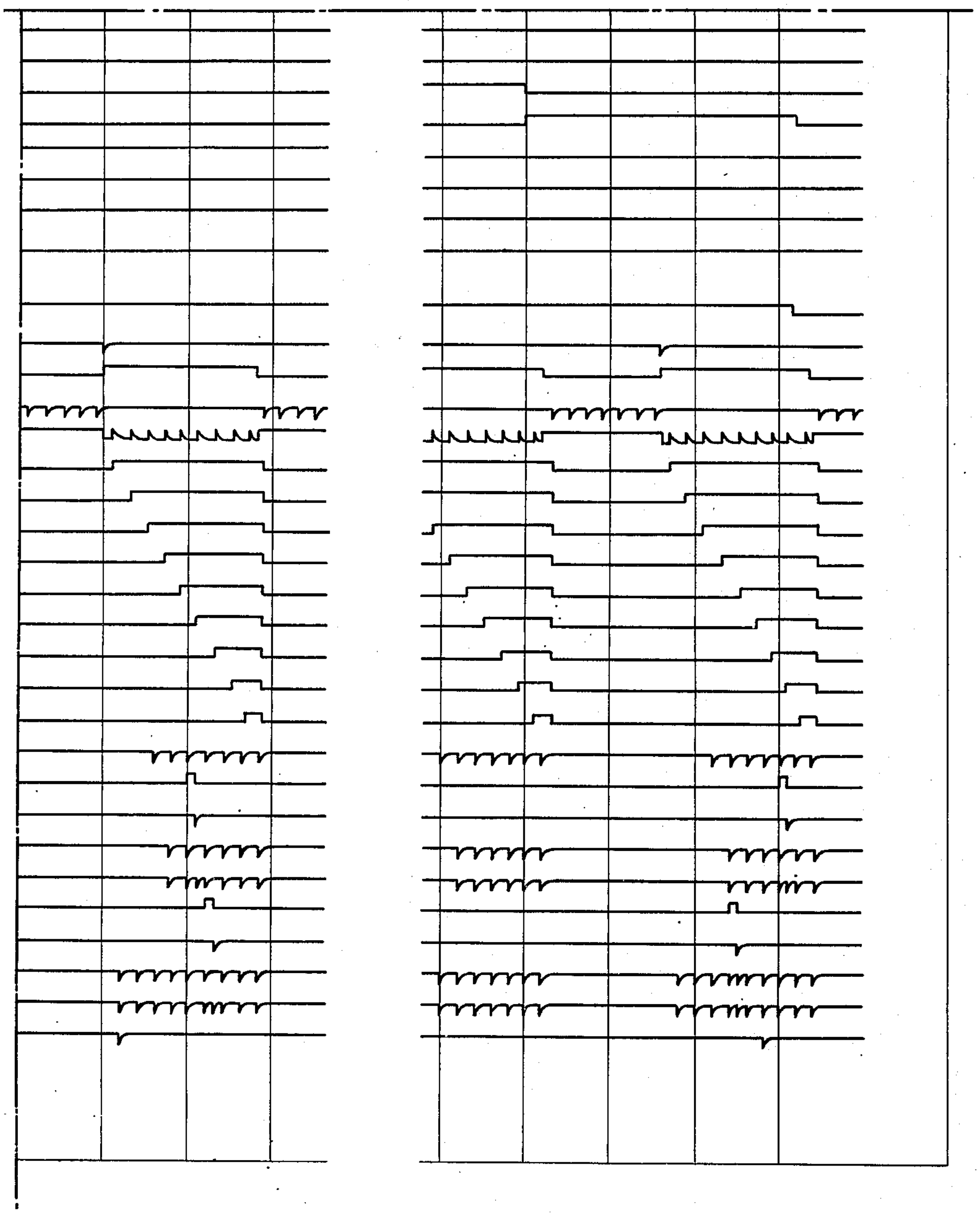

Referring to Figs. 3*d* and 3*e*, the triggers of each order of the result register are individually represented by a block diagram as in Fig. 2*a*. Fig. 3*d* shows the units, tens, and hundreds order and Fig. 3*e* shows the thousands, ten-thousands, and hundred-thousands orders.

The units order RRU will be described in detail and the remaining orders will be described with reference to it.

The units order RRU includes five trigger circuits as shown in Fig. 2. These triggers are connected in series chain so that each trigger is initially in the Left condition. The five triggers are designated from left to right as UT1, UT2, UT4, UT8, and TCU, respectively. The triggers UT1, UT2, UT4, and UT8, when in the Right condition, are representative of the receipt of the digits 1, 2, 4, and 8, respectively, into the result register. The trigger TCU is provided to aid in effecting the timed transfer of a carry pulse to the tens order RRT after each tenth input pulse has been applied to the units order RRU. The timing of this carry pulse is such that it cannot occur when a negative input pulse is transferred over the lead 16 to the tens order RRT. Each of the triggers UT1, UT2, UT4, UT8, and TCU is constructed to be relatively non-responsive to positive pulses and as compared to its response to a negative pulse. Hence, the stable condition of any trigger may be switched by a negative pulse and be non-responsive to a positive pulse of similar shape and magnitude. A cycle of operation of the triggers UT1, UT2, UT4, and UT8 of the units order is illustrated by Table IV wherein L indicates that the particular trigger is in the Left condition and R indicates that the particular trigger is in the Right condition.

TABLE IV

*Result register, units order RRU*

| Input Pulses (lead 29) | Triggers | | | |
|---|---|---|---|---|
| | UT1 | UT2 | UT4 | UT8 |
| 0 | L | L | L | L |
| 1 | R | L | L | L |
| 2 | L | R | L | L |
| 3 | R | R | L | L |
| 4 | L | L | R | L |
| 5 | R | L | R | L |
| 6 | L | R | R | L |
| 7 | R | R | R | L |
| 8 | L | L | L | R |
| 9 | R | L | L | R |
| | | R | | |
| 10 (0) | L | L | L | L |

The first negative input pulse transferred over the lead 29 to the terminal I of trigger UT1 causes it to switch to the Right condition. The increased voltage at the terminal *pr*L of the trigger UT1 is transferred over a lead 140 to the terminal I of the trigger UT2. However, trigger UT2 remains in the Left condition because the positive voltage pulse impressed upon the control grids of its tubes is insufficient to cause a switching of the stable condition of the trigger.

The second input pulse applied to the trigger UT1 causes it to switch to the Left condition which causes a decreased voltage at the terminal *pr*L. This decreased voltage is transferred over lead 140 to the trigger UT2 to cause it to switch to the Right condition. The increased voltage transferred from trigger UT2 over a lead 140 to trigger UT4 is insufficient to switch the stable condition of UT4.

When the trigger UT2 is switched to the Right condition a decreased voltage appears at the terminal *g*L thereof and is transferred therefrom over a lead 141 and a capacitor 142 to the terminal *pr*R of the trigger UT8. However, this decreased voltage is insufficient to effect a change in the stable condition of the trigger UT8. The arrow on the end of lead 142 pointing to the terminal *pr*R indicates that the plate resistor of the tube R of the trigger UT8 is a potentiometer and that the lead 142 is connected to the arm thereof. Such an arrangement is included to provide for easy adjustment of pulse magnitude.

It is shown that the first two input pulses cause normal binary operation of the triggers. Such is continued until the tenth input pulse is applied to the trigger UT1. It is seen that as a result of the application of the eighth input pulse to the trigger UT1, the trigger UT8 is switched to the Right condition. The resulting increased voltage at the terminal *pr*L of the trigger UT8 is transferred over the lead 140 and a capacitor 143 to the terminal *g*L of the trigger TCU. However, this increased voltage has no effect on the stable condition of TCU because it is already in the Left condition.

When the tenth input pulse is applied to UT1, it is switched to the Left condition. The resulting decreased voltage at terminal *pr*L of the trigger UT1 is transferred to the trigger UT2 and initiates a switching thereof to the Right condition. This decreased voltage at the terminal *pr*L of the trigger UT1 is also transferred over leads 140 and 145 and capacitor 144 to the terminal *g*R of the trigger UT8 and effects a switching of the trigger UT8 from the Right condition to the Left condition. When the trigger UT8 is switched to the Left condition, the decreased voltage appearing at its terminal *pr*L is transferred to the terminal *g*L of the trigger TCU (not shown in Table IV) to switch it to the Right condition. At the same time the increased voltage at the terminal *pr*R of the trigger UT8 is transferred over a lead 141 and capacitor 142 to the terminal *g*L of the trigger UT2. This increased voltage is sufficient to prevent a complete switching of the trigger UT2 to the Right condition and effectively blocks it in the Left condition. Such is denoted by the R intermediate the ninth and tenth input pulses of Table IV.

It should be noted that positive E pulses give rise to the input pulses applied to the trigger UT1. When the trigger TCU is switched to the Right condition (by the trigger UT8 in response to the tenth input pulse) a decreased voltage appears at the terminal *pr*R of the trigger TCU. This decreased voltage is transferred over the lead 15 and capacitor 146 to the control grid of the buffer tube B14 (Fig. 3*a*). However, this negative voltage has no effect on B14 since it is non-conductive. The next negative E pulse is transferred over the leads 10E (Fig. 3*a*) and 12 and a capacitor 147 to the terminal *g*R of the trigger TCU. This negative pulse decreases the voltage on the control grid of the tube R of TCU and effects a switching of the trigger to the Left condition. When this occurs, a positive pulse is transferred over the lead 15 and the capacitor 146 to the control grid of the tube B14 (Fig. 3*a*) to render it conductive. When tube B14 is rendered conductive, a negative pulse is transferred from its plate circuit over the lead 16 to the terminal I of trigger TT1 of the tens order RRT of the result register. In this manner carry pulses are applied to the tens order RRT after each tenth input pulse is applied to the units order RRU to advance the tens order by a count of one.

It should be noted that the positive E pulses are used to effect ordinary entries into the units order RRU and after each such entry is made therein the next negative E pulse may be used to effect carry to the tens unit RRT, the carry being effected before another positive E pulse occurs. The novel arrangement of the buffer tube B14 (Fig. 3*a*) and the gate tube G24 (Fig. 3*a*), respectively, permits the normal and carry entries to the tens order RRT to be transferred thereto over the same lead 16.

Four neon bulbs, 151, 152, 154, and 158 are connected from the terminals *p*L of the triggers UT1, UT2, UT4, and UT8, respectively, to a lead 153 connected at its other end to the bias voltage line 83*b*. When a trigger is in the Left condition, the voltage across the neon bulb connected to its terminal *p*L is insufficient to cause the bulb to glow. However, when a trigger is switched to the Right condition the voltage at its terminal *p*L is increased sufficiently to cause the corresponding bulb to glow. Hence, the bulbs 151, 152, 154, and 158 correspond respectively to the digits 1, 2, 4, and 8, as do their corresponding triggers. To illustrate, after seven input pulses have been applied to the trigger UT1, each of the triggers UT1, UT2, and UT4 is in the Right condition and the bulbs 151, 152, and 154 glow. The bulb 151 corresponds to the digit 1, the bulb 152 to the digit 2, and the bulb 154 to the digit 4. The sum of these digits is 7, the number of input pulses applied to the trigger UT1. Hence by merely noting the bulbs which glow and adding together the digits represented by them the product standing in the units order is obtained.

The tens order RRT includes four trigger circuits TT1, TT2, TT4, and TT8 similar to the corresponding triggers of the units order RRU and identically inter-connected as the triggers of the units order. Table IV is therefore representative of a cycle of operation of the tens order.

The tens order also includes a trigger TCT for aiding in effecting carry between the tens order and the hundreds order RRH.

When the trigger TCT is switched to the Right condition by the trigger TT8 in response to the tenth input pulse transferred over the lead 16 to the trigger TT1, a negative pulse is transferred over the lead 18 and capacitor 159 to the control grid of the buffer tube B17. This pulse has no effect on the conductive condition of B17 (Fig. 3*a*) because it was non-conductive before the pulse was applied to it. The next negative E pulse is transferred over leads 10E (Fig. 3*a*), 12 and 13 to the control grid (terminal *g*R) of the conducting tube R of trigger TCT. This switches TCT to the Left condition. As a result a positive pulse is transferred over the lead 18 and capacitor 159 to the control grid of the buffer tube B17 (Fig. 3*a*) to render it conductive. A decreased voltage in its plate circuit is transferred over the lead 19 to the trigger HT1 of the hundreds order RRH to advance that order by a count of one. Again, as in effecting carry between the units and tens order, positive E pulses are used to effect normal entries into the tens order and after ten entries are made therein the next negative E pulse is used to effect carry to the hundreds order RRH before another positive E pulse occurs. The novel arrangement of the buffer tube B17 (Fig. 3*a*) and the gate tube G25 (Fig. 3*a*), respectively, permits the normal and carry entries to the hundreds order RRH to be transferred thereto over the same lead 19.

The hundreds order includes four triggers HT1, HT2, HT4, and HT8 connected and arranged exactly as the triggers UT1, UT2, UT4 and UT8 of the units order RRU.

The thousands order RRT*h* includes four triggers T*h*T1, T*h*T2, T*h*T4, and T*h*T8 connected and arranged exactly as the triggers UT1, UT2, UT4, and UT8 of the units order RRU. However, the only input to the thousands order RRT*h* is transferred over the lead 20 to the trigger T*h*T1. This input is effected when the trigger HT8 is switched to the Left condition in response to each tenth input pulse to the hundreds order.

The ten-thousands order RRTT*h* and the hundred-thousands order RRHT*h* are identical with the thousands order RRT*h*. When the trigger T*h*T8 is switched to the Left condition a negative pulse is transferred over the lead 21 to the trigger TT*h*T1 of the ten-thousands order RRTT*h* to advance the digital representation in that order by a count of one. Similarly when the trigger TT*h*T8 of the ten-thousands order RRTT*h* is switched to the Left condition a negative pulse is transferred over the lead 22 to the trigger HT*h*T1 of the hundred-thousands order RRHT*h* to add a count of one to the digital representation standing in the hundred-thousands order.

*Operation*

Referring to Fig. 3*b*, the terminal L of the calculate switch 50 is connected to the bias-voltage line 83*b* through a resistor and the upper terminal U is connected intermediate two resistors connected at their other ends to the ground line 72*g* and the high voltage line 74*h*, respectively. The pivot end of the blade of the switch 50 is connected through a capacitor to the control grid of the amplifier tube C160. This control grid is connected through a bias resistor to the bias-voltage line 83*b* so that the tube is normally non-conductive.

To initiate the multiplication operation, the blade of switch 50 is momentarily pressed into contact with its terminal U and then allowed to return into normal contact with its terminal L. When the blade makes contact with the terminal U, a positive bias is applied to the control grid of the tube C160 to cause that tube to be rendered momentarily conductive. As a result a negative pulse is transferred over the lead 53 from the plate of the tube C160 to the trigger M*p*HT9 (Fig. 3*c*) of the hundreds order M*p*H of the multiplier receiving device M*p*. This pulse causes M*p*HT9 to switch to the Left condition, At the same time a negative pulse is transferred over the lead 52 and capacitor 116 (Fig. 3a) to the control grid (terminal gL) of the conducting tube L of the trigger 49 (Fig. 3a) causing it to switch to the Right condition. Referring now to Fig. 3a, when the trigger 49 is switched to the Right condition, the increased voltage at the control grid (terminal gR) of the conducting tube R thereof is impressed on the control grid of the tube G51 to increase its bias above the cutoff value to thereby condition the tube. Hence, tube G51 is rendered conductive in response to subsequent positive D pulses applied to its suppressor grid to transfer negative pulses over the lead 58 to the units order MpU of the multiplier receiving device Mp (Fig. 3b) as previously described. Also, when the trigger 49 switches to the Right condition, a positive pulse is transferred from terminal gR thereof over the leads 55 and 56 to the control grid of the non-conducting tube R of the trigger 48. However, this pulse is of insufficient amplitude to switch the trigger 48 to the Right condition.

As explained hereinbefore, the control grid and suppressor grid of the tube 60a of the novel multiplier interpreter 47 are connected to the commonly connected terminals of the push-button switches associated with the tens and hundreds order, respectively, of the multiplier receiving device. Hence, each of these grids is raised to a conductive voltage during a portion of the multiplier receiving device cycle proportional to the value of these respective digits of the multiplier. Likewise, the control grid of the tube 62a of the multiplier interpreter 47 is connected to the commonly connected terminals of the push-button switches associated with the units order of the multiplier receiving device and is raised to a conductive voltage during a portion of the multiplier cycle proportional to the value of the units digit of the multiplier.

Hence, the tubes 60a and 62a are normally non-conductive. It is seen that the plate load resistor 165 of the tube 60a and resistors 166 and 167 form a voltage divider between the high-voltage line 74h and the bias-voltage line 83b. These resistors are of such value that when the tube 60a is non-conductive the voltage at the junction of the resistors 166 and 167 transferred over a lead 168 to the control grid of the tube B61 is sufficiently high to render the tube B61 conductive. When the tube 60a is rendered conductive it causes an increased voltage drop across the resistor 165 and decreases the voltage at the control grid of the tube B61 so that it is rendered non-conductive.

Voltage divider networks similar to that comprising the resistors 165, 166 and 167 are associated with the tubes B61 and 62a, respectively, so that voltage changes at the plates of the tubes B61 and 62a cause a similar change at the suppressor grid and control grid of the tubes 62a and B63, respectively. Hence, when the tube B61, normally conductive, is rendered non-conductive by the conduction of the tube 60a a positive voltage is transferred to the suppressor grid of the tube 62a to condition it to be responsive to the positive voltage transferred over the lead 68 to the control grid thereof. Also, when the tube 62a is rendered conductive a negative voltage is transferred to the control grid of the tube B63 to render it non-conductive and cause a positive pulse to be transferred over a capacitor 169 and the lead 71 to the control grid (terminal gL) of the tube L of the trigger 48. The screen grid of each of the tubes B14, B17, G23, G24, G25, G35, G36, G51, 60a and 62a is connected through a resistor to a line 80i having a voltage thereon intermediate ground and the voltage on the high voltage line 74h.

As is seen from the description of the multiplier receiving device when a number of pulses (in response to positive D pulses) equal to the nine-hundred-and-ninety-nine complement of the multiplier have been transferred over the lead 58 from the plate of the tube G51 to the units order MpU (Fig. 3c) of the multiplier receiving device Mp, the control grid and suppressor grid of the tube 60a and the control grid of the tube 62a are raised to conductive voltage. As a result tube 60a is rendered conductive to cause the tube B61 to be rendered non-conductive. When the tube B61 is rendered non-conductive it causes the suppressor grid of the tube 62a to be raised to conductive voltage. Since both the control grid and suppressor grid of the tube 62a are at conductive voltage that tube becomes conductive and causes the tube B63 to be rendered non-conductive. As a result a positive pulse is transferred over the capacitor 169 and the lead 71 to the conductive tube L of the trigger 48. This pulse has no effect on the stable condition of the trigger 48 because it is applied to the control grid of the conductive tube thereof.

However, as the next negative pulse (i. e. the one-thousand complement of the multiplier) is applied to the units order MpU of the multiplier receiving device, a negative pulse is transferred over the lead 68 to the control grid of the tube 62a to render that tube non-conductive. The tube B63 is rendered conductive thereby and a negative pulse is transferred to the conducting tube L of the trigger 48 to switch that trigger to the Right condition. The resulting positive pulse transferred to the terminal gR of the trigger 49 has no effect on its stable condition since it is already in the Right condition. When the trigger 48 is switched to the Right condition, the increased voltage at its terminal gR is transferred over the leads 56 and 56a to the control grid of the tube G46 to condition it to be responsive to the next positive C pulse applied to its suppressor grid from the lead 11C. When tube G46 is rendered conductive by the first positive C pulse a negative pulse is transferred over a capacitor 170 and the lead 45 to the control grid to the conducting tube L of the trigger Tmc to switch it to the Right condition. When the trigger Tmc is so switched, the decreased voltage at the potentiometer 171 is transferred over the potentiometer arm 171a and lead 42 to the control grid of the tube G35 to de-condition it. At the same time the increased voltage at the control grid of the tube R of the trigger Tmc is transferred over the lead 43 to the control grid of the tube G36 to condition it to be responsive to subsequent negative E pulses applied to its suppressor grid. Accordingly, a positive input pulse is applied from the plate of the tube G36, the leads 39 and 38 to the multiplicand receiving device (Fig. 3d) in response to each negative E pulse applied to the tube G36. These input pulses cause sequential operation of the multiplicand receiving device as described hereinbefore.

Finally, when the trigger MT1 of the multiplicand receiving device is switched to the Right condition a positive bias is applied to the potentiometer 131 to condition the trigger Tmc to be switched to the Left condition by the next negative F pulse applied to the control grid of its tube R. When the trigger T*mc* switches to the Left condition the tube G36 is de-conditioned and the tube G35 is conditioned. The next positive F pulse applied to the suppressor grid of the tube G35 causes it to conduct and apply a negative pulse over the lead 38 to triggers of the multiplicand receiving device to place them all in the Left condition.

The trigger 48 remains in the Right condition and the trigger T*mc* is switched a number of timers equal to the number of positive C pulses occurring. During each switching of T*mc* the multiplicand is entered into the result register one time in the manner previously described.

In response to the thousands input pulse to the multiplier receiving device the trigger HT0 is switched to the Left condition. A negative pulse is transferred therefrom over leads 54 and 55 to the control grid of the conducting tube R of the trigger 49 and over the leads 54 and 56 to the control grid of the conducting tube R of the trigger 48 to cause the triggers 48 and 49 to switch to the Left condition. When the trigger 48 is switched to the Left condition it de-conditions the tube G46 and the next negative F pulse switches the trigger T*mc* to the Left condition. This switching of the trigger T*mc* causes the tube G35 to the conditioned and the tube G36 to be de-conditioned as explained above. As described the next positive F pulse causes G35 to conduct and a negative pulse is transferred over the lead 38 to the triggers of the multiplicand receiving device to place them in the Left condition. When these triggers are switched to the Left condition, the positive voltage applied over the leads 32, 33, and 34 to the control grid of the tubes G23, G24, and G25, respectively, is removed and those tubes de-conditioned to prevent any further entries into the result register. The circuit is now in its initial starting condition except that the product stands in the result register.

*Multiplier of zero.*—The novel operation in response to a multiplier having a value of 000 will now be described. The push-button switches US0, TS0 and HS0 (Fig. 3*a*) of the units, tens and hundreds orders of the multiplier receiving device M*p* are depressed as shown. Again the operation of the calculate switch 50 causes the trigger 49 (Fig. 3*a*) to switch to the Right condition and the trigger M*p*HT9 (Fig. 3*c*) of the hundreds order M*p*H of the multiplier receiving device to switch to the Left condition.

Negative input pulses are then applied to the units order M*p*U over the lead 58 in response to positive D pulses transferred over the lead 11D to the suppressor grid of the gate tube G51 (Fig. 3*a*). These input pulses cause normal switching of the triggers of the multiplier receiving device as descrbed in connection with description pertaining to Table II.

In response to the nine-hundred-and-ninetieth input pulse the voltage is increased at the left terminals of the switches US9, TS0 and HS0. The nine-hundred-and-ninety-ninth input pulse causes the voltage to be increased at the left terminal of each of the three depressed push-button switches US9, TS0 and HS0. Accordingly, this increased voltage is transferred over the leads 68, 69 and 70 to the control grid of the tube 62*a*, the suppressor grid of the tube 60*a*, and the control grid of tube 60*a* respectively. As a result the tube B63 is rendered non-conductive and causes a positive pulse to be transferred over the lead 71 to the control grid of the conducting tube L of the trigger 48 and has no effect on the stable condition thereof.

The one-thousands input pulse applied to the multiplier receiving device causes the triggers M*p*UT0 and M*p*UT9 of the units order M*p*U to be switched to the Left condition, the triggers M*p*TT0 and M*p*TT9 of the tens order M*p*T to be switched to the Left condition and the trigger M*p*HT0 of the hundreds order M*p*H to be switched to the Left condition. As the trigger M*p*UT0 is switched to the Left condition, a negative bias voltage is transferred therefrom over the lead 68 to the control grid of the tube 62*a* (Fig. 3*a*) to decrease the voltage on that control grid so that the tube 62*a* is rendered non-conductive. This causes the buffer tube B63 (Fig. 3*a*) to conduct and thereby transfer a negative pulse over the lead 71 to switch the trigger 48 to the Right condition. This switching of the trigger M*p*U to the Left condition eventually results in the switching of the trigger M*p*HT0 to the Left condition as described in connection with the operation of the multiplier receiving device.

When the trigger M*p*HT0 is finally switched to the Left condition a negative pulse is transferred, as previously described, to the conducting tubes R of the triggers 48 and 49 (Fig. 3*a*) to switch these triggers back to the Left condition. This switching of the trigger 48 causes the tube G46 to be de-conditioned. The next negative F pulse causes the trigger T*mc* to be switched to the Left condition which causes the gate tube G35 to be conditioned and the gate tube G36 is de-conditioned so that the tube G35 in response to the next positive F pulse will switch all triggers in the multiplicand receiving device (Fig. 3*b*) to the Left condition.

The actual time that the trigger 48 is in the Right condition as a result of the switching of the trigger M*p*UT0 to the Left condition by the one-thousands input pulse to the multiplier receiving device is so brief that the gate tube G46 does not receive a positive C input pulse from the circuit network 11 (Fig. 3*b*) during that time. Because the tube G46 is rendered conductive by a positive C pulse, which does not occur during the time the trigger 48 is in the Right condition, the trigger T*mc* is not switched to the Left condition as would occur if a multiplier of any value other than zero was employed. The fact that the trigger T*mc* remains in the Left condition during the time interval between the switching of the trigger M*p*UT0 to the Left condition and the switching of the trigger M*p*HT0 to the Left condition causes the gate tube G35 to remain conditioned so that the multiplicand is not entered into the result register.

*Problem.*—The operation of the multiplier in performing a particular multiplying operation will now be described with reference to the diagrammatic showings of the timing chart comprising Figs. 4*a*, 4*b*, 4*c*, 4*d*, 4*e*, 4*f*, 4*g*, and 4*h* arranged in the manner illustrated in Fig. 4. Various component parts of the circuit are listed on the left side of the chart. For clarity of presentment the digit-representing elements or triggers of each order M*p*U, M*p*T, and M*p*H of the multiplier receiving device are grouped together and the triggers of the multiplicand receiving device Mc are grouped together and accordingly labelled. Likewise, the tubes 60*a*, 62*a*, and B63 of the multiplier interpreter are grouped together. The E, F, C, and D pulses are shown from the top of the timing chart reading downward. The operation of the circuits producing these pulses is not shown on the chart.

Where a tube designated on the chart is followed by (*p*), (*sp.g*) or (*c.g.*) the corresponding horizontal line on the chart indicates the voltage at the plate, suppressor grid and control grid, respectively, of the tube designated.

The initial or starting condition of the multiplier is illustrated at the extreme left of the chart. At starting all the trigger circuits are in the Left condition except the trigger M*p*HT9. When the line representing the stable condition of any trigger goes upward it indicates a switching of the trigger to the Right condition and when such a line goes downward it indicates a switching of the trigger to the Left condition. All gate tubes, except G35, are initially non-plate-current conductive. Accordingly, when the voltage-representing line thereof goes down the gate tube represented thereby is rendered plate-current conductive. The tube G35 is initially responsive to positive F pulses so that each positive F pulse causes a negative pulse to appear at its plate as illustrated. Since it is assumed that all triggers of the multiplicand receiving device Mc are in the Left condition this conduction of the tube G35 has no effect on the stable condition of any other circuit.

The timing chart corresponds to the operations effected when the multiplicand 967 is multiplied by the multiplier 686. In view of the many pulses required to effect the operation necessary to obtain the product of these numbers it is impractical to show all of the pulses on the timing chart. Accordingly, a series of breaks appear in the chart and a number of vertical lines are extended upward therefrom. Such a vertical line is shown at the beginning and end of each break in the chart and are used to define that particular break. For example, the break in the chart between the vertical lines A and B is referred to as the break A—B.

Before closing the calculate switch to initiate multiplication the push buttons of switches US6, TS8, and HS6 of the multiplier receiving device are depressed and the push buttons of switches MS7, MS6, and MS9 of the units, tens, and hundreds orders, respectively, of the multiplicand receiving device are depressed. Then the blade of the calculate switch 50 is placed to contact its terminal U and the tube C160 is rendered conductive as illustrated in the chart by the decreased voltage at its plate. The decreased plate voltage of the tube C160 causes the trigger 48 to switch to the Right condition and the trigger M*p*HT9 to switch to the Left condition. The next positive D pulse causes the tube G51 to conduct and the negative pulse produced thereby switches M*p*UT9 and M*p*UT8 to the Right condition. The next positive D pulse causes the trigger M*p*UT8 to switch back to the Left condition and the trigger M*p*UT7 to switch to the Right condition.

During the break A—B the triggers of M*p*U are switched, as shown in Table II, in response to the positive D pulses. The next positive D pulse (i. e. the tenth following the break A—B causes the triggers M*p*UT0 and M*p*UT9 to be switched to the Left condition to transfer a carry pulse to M*p*T to switch the triggers M*p*TT9 and M*p*TT8 to the Right condition.

During the break C—D the triggers of M*p*U are switched in the manner shown in Table II and a carry pulse is transferred to M*p*T in response to each tenth pulse applied to M*p*U. The first positive D pulse occurring after break C—D (i. e. the last pulse of the tenth cycle) causes the triggers M*p*UT9 and M*p*UT0 to be switched to the Left condition which causes the triggers M*p*TT9 and M*p*TT0 to be switched to the Left condition which in turn causes the triggers M*p*HT9 and M*p*HT8 to be switched to the Right condition. Hence, carry is effected from the units order M*p*U to the tens order M*p*T and from the tens order M*p*T to the hundreds order M*p*H.

During the break E—F normal switching of the multiplier receiving device is continued. The first positive D pulse after the break E—F causes the trigger M*p*UT6 to be switched to the Right condition and the trigger M*p*UT7 to be switched to the Left condition. Since the push-button switch US6 is depressed, the switching of M*p*UT6 to the Right condition causes a positive voltage to be impressed on the control grid of the tube **62*a* to raise the voltage thereon to a conducting value. However, since tube B61 (not shown on the timing chart) is conductive the tube 62*a*** does not become conductive. The next positive D pulse causes the trigger M*p*UT6 to switch to the Left condition and the trigger M*p*UT5 to switch to the Right condition. This switching of M*p*UT6 causes the control grid voltage of the tube **62*a*** to be decreased to a non-conducting value. As explained in connection with the circuit diagram, each time the trigger M*p*UT6 is here switched to the Right condition the control grid voltage of the tube **62*a*** is raised to a conducting value and each time it is switched to the Left condition the control grid voltage is decreased to a non-conducting value. In other words, the switching of the trigger M*p*UT6 to the Right condition conditions the tube **62*a* to be rendered conductive in response to the non-conduction of the tube B61** and the switching of the trigger M*p*UT6 to the Left condition de-conditions the tube **62*a***. Similarly, when the trigger M*p*TT8 is switched to the Right condition the control grid voltage of the tube **60*a*** is raised to a conducting value and when the trigger M*p*TT8 is switched to the Left condition the control grid voltage is decreased to a non-conducting value. Also, when the trigger M*p*HT6 is switched to the Right condition the suppressor grid voltage of the tube **60*a*** is raised to a conducting value and when the trigger M*p*HT6 is switched to the Left condition the suppressor grid voltage is decreased to a non-conducting value. Every change of voltage on the grids of the tubes **60*a* and 62*a*** is not shown in the timing chart.

The units order M*p*U has now responded to eleven cycles of operation and to four pulses of the twelfth cycle and the break G—H is entered. During the break G—H successive cycles of the units order M*p*U cause sequential operation of the tens order M*p*T and successive cycles of the tens order cause sequential operation of the hundreds order M*p*H.

The first positive D pulse after the break G—H shows the circuit conditions at the end of the thirtieth cycle of the units order M*p*U. The triggers M*p*UT9 and M*p*UT0 are in the Left condition, the triggers M*p*TT9 and M*p*TT0 are in the Left condition and the triggers M*p*HT7 and M*p*HT6 are in the Left condition and Right condition, respectively. Since the push button of switch HS6 is depressed the suppressor grid voltage of the tube **60*a*** rises to a conducting value when the trigger MpHT6 switches to the Right condition.

During the break J—K the units order MpU goes through its thirty-first cycle of operation. The first positive D pulse following the break J—K represents the last pulse of this thirty-first cycle. The triggers MpUT9 and MpUT0 are switched to the Left condition, and the triggers MpTT9 and MpTT8 are switched to the Right condition. When the trigger MpTT8 is switched to the Right condition the control grid voltage of the tube 60*a* is raised to a conducting value. The tube 62*a* then conducts and causes the tube B61 to be rendered non-conductive to raise the suppressor grid voltage of the tube 62*a* to a conducting value. However, the tube 62*a* is not rendered conductive because the voltage on its control grid is below the conducting value.

During the break M—N the first and second pulses of the thirty-second cycle of MpU occur. The first pulse switches the triggers MpUT9 and MpUT8 to the Right condition and the second pulse switches the triggers MpUT8 and MpUT7 to the Left condition and Right condition, respectively.

The first positive D pulse after the break M—N (third pulse of the thirty-second cycle) causes the triggers MpUT7 and MpUT6 to be switched to the Left condition and Right condition, respectively. When the trigger MpUT6 switches to the Right condition the control grid voltage of the tube 62*a* is again increased to a conducting value. This completes the setting up of the units, tens, and hundreds digits in the multiplicand receiving device. Since the tube B61 is already non-conductive the switching of the trigger MpUT6 to the Right condition causes the tube 62*a* to be rendered conductive to render the tube B63 non-conductive and thereby transfer a positive pulse from its plate to the trigger 48 which does not respond because it is in the Left condition.

The next positive D pulse causes the triggers MpUT6 and MpUT5 to be switched to the Left condition and Right condition, respectively. When the trigger MpUT6 so switches the control grid voltage of the tube 62*a* is decreased to a non-conducting value to render the tube non-conductive. This renders the tube B63 conductive and a negative pulse is transferred from its plate to the trigger 48 to switch it to the Right condition and thereby condition the tube G46 (conditioning not shown) to respond to subsequent positive C pulses from the circuit network 11. The next positive C pulse renders the tube G46 conductive and a negative pulse is transferred to the trigger T*mc* to switch it to the Right condition and thereby condition the tube G36 (conditioning not shown) and render the tube G35 non-conductive. Subsequent negative E pulses cause the tube G36 to transfer positive pulses to the multiplicand receiving device Mc. The next nine negative E pulses effect a switching of the triggers of the multiplicand receiving device to the Right condition as shown and previously described. Since 9 is the highest digit in the multiplicand, as the trigger MT9 is switched to the Right condition, the tube G25 is conditioned (conditioning not shown) so that each subsequent positive E pulse applied to its suppressor grid causes a negative pulse to be transferred into the hundreds order RRH of the result register. The next highest digit in the multiplicand is 7. When the trigger MT7 is switched to the Right condition the tube G23 is conditioned (conditioning not shown) so that each subsequent positive E pulse applied to its suppressor grid causes a negative pulse to be transferred to the units order RRU of the result register. The lowest digit of the multiplicand is 6. Accordingly, when the trigger MT6 is switched to the Right condition the tube G23 is conditioned (conditioning not shown) so that each subsequent positive E pulse applied to its suppressor grid causes a negative pulse to be transferred into the tens order RRT of the result register. It is now apparent that the multiplicand has been entered into the result register one time, the units order RRU stands at a value of 7, the tens order RRT stands at a value of 6, and the hundreds order RRH stands at a value of 9.

When the trigger MT9 is switched to the Right condition a bias is applied to the trigger T*mc* in the manner previously explained so that the next negative F pulse switches T*mc* to the Left condition. This switching of the trigger T*mc* renders the tube G36 non-conductive and conditions the tube G35 so that the next positive F pulse renders the latter conductive. The conduction of the tube G35 in response to the first positive F pulse causes all triggers of the multiplicand receiving device to be switched to the Left condition simultaneously.

It should be noted that the trigger 48 remains in the Right condition until the trigger MpHT0 is switched to the Left condition. Until the trigger MpHT0 is so switched, the tube G46 remains conditioned and is rendered conductive by positive C pulses. Each time the trigger MT1 is switched to the Right condition it biases the trigger T*mc* so that the next negative F pulse switches it to the Left condition. The conduction of the tube G46 in response to the next positive C pulse switches the trigger T*mc* back to the Right condition. Hence, the trigger T*mc* goes through a number of cycles of operation equal to the number of positive C pulses occurring before the trigger 48 is switched to the Left condition. Each time the trigger T*mc* is switched to the Left condition the multiplicand is entered into the result register one time.

The second cycle of the multiplicand receiving device Mc, shown just prior to the break P—Q, illustrates the carry effected in the result register. The third pulse entered into the units order RRU causes it to advance from a count of 9 to a count of 0. Accordingly, the units carry trigger TCU is switched to the Right condition. The next negative E pulse switches the trigger TCU back to the Left condition and renders the tube G14 conductive. A negative input pulse is then transferred from the plate of the tube G14 to the tens order RRT. Similarly, the fourth input pulse applied to the tens order RRT causes the tens carry trigger TCT to be switched to the Right condition. The next negative E pulse switches the trigger TCT back to the Left condition to render the tube G17 conductive. As a result a negative input pulse is transferred from the plate of the tube G17 to the hundreds order RRH. The first pulse of this second cycle switches the trigger HT8 of RRH to the Left condition thereby converting the order from a count of 9 to a count of 0 so that a single input pulse is applied to RRT*h*.

During the break P—Q the multiplicand receiving device continues to advance cyclically to effect repeated entry of the multiplicand into the result register.

The nine-hundred-ninety-ninth positive D pulse causes the triggers MpUT1 and MpUT0 to switch to the Left and Right conditions, respectively, MpTT1 and MpTT0 to switch to the Left and Right conditions, respectively, and MpHT1 and MpHT0 to switch to the Left and Right conditions, respectively. When the trigger MpHT0 switches to the Right condition a positive pulse is transferred to the control grid of the tube R of the trigger 48 but has no effect on its stable condition because it is already in the Right condition.

When the one-thousands positive D pulse is applied to the triggers of MpU the triggers MpUT9 and MpUT0 are switched to the Left condition. The triggers MpTT9 and MpTT0 are switched to the Left condition and the trigger MpHT9 is switched to the Left condition. As a result all triggers of the multiplicand receiving device are in the Left condition except the trigger MpHT9. When the trigger MpHT0 is switched to the Left condition a negative pulse is transferred therefrom to effect a switching of the triggers 48 and 49 to the Left condition. When the trigger 48 is so switched the tube G46 is rendered non-conductive. The next negative F pulse then switches the trigger Tmc to the Right condition and the tube G36 is rendered non-conductive and the tube G35 is conditioned. The next positive F pulse renders the tube G35 conductive to cause all triggers in the multiplicand receiving device to be switched simultaneously to the Left condition. This switching de-conditions the tubes G23, G24, and G25 so that further entries cannot be made into the result register.

The entire circuit is now returned to its initial starting condition and the product of the multiplicand 967 and the multiplier 686 is indicated by the result register. This product is 663,362 and is obtained by noting the lighted bulbs in the result register. In the units order the bulb 152 is lighted to indicate a digit of 2, in each of the tens, ten-thousands, and one-hundred-thousands orders RRT, RRTTh, and RRHTh, respectively, the bulbs 152 and 154 are lighted to indicate a digit of 6 and in each of the hundreds and thousands orders RRH and RRTh, respectively, the bulbs 151 and 152 are lighted to indicate a digit of 3.

While there have been shown and described and pointed out the fundamental novel features of the invention as applied to a preferred embodiment, it will be understood that various omissions and substitutions and changes in the form and details of the circuits illustrated and in their operation may be made by those skilled in the art, without departing from the spirit of the invention. It is the intention, therefore, to be limited only as indicated by the scope of the following claims.

What is claimed is:

1. An electronic multiplier for effecting multiplication of a multiplier and a multiplicand to obtain the product thereof including a multiplier receiving device having an order corresponding to each order of the multiplier, a multiplicand receiving device having a single order of counting elements to accommodate a multiplicand having a plurality of orders, a result register having an order corresponding to each order of said product, a first source of pulses for effecting operation of said multiplicand receiving device and said result register, a second source of pulses comprising a frequency divider network having a recurrence frequency determined by said first source of pulses and connected to be operable in response thereto, circuits intermediate said sources of pulses for permitting the selective operation of said multiplicand receiving device in response to said first source of pulses and circuits intermediate said second source of pulses and said multiplier receiving device for effecting the selective operation of said multiplier receiving device in response to pulses from said second source.

2. In a multiplier having a multiplicand receiving device and a multiplier receiving device of preselected digital capacity, a trigger circuit having two stable conditions alternately assumed, coincidence circuits responsive to said multiplier receiving device upon the receipt of pulses collectively representing a value equal to the difference between the digital capacity thereof and a chosen multiplier and a connection from the coincidence circuits to said trigger to switch the latter to one stable condition in response to the next pulse applied to said multiplier receiving device after said coincidence circuit is rendered so responsive, circuit means intermediate said trigger and said multiplicand receiving device to permit pulse entry into the latter when the former is switched to said one stable condition, and a connection from said multiplier receiving device to said trigger to switch the latter from said one stable condition when the former has received a number of pulses equal to its digital capacity to prevent further pulse entry into said multiplicand receiving device.

3. An electronic multiplier for obtaining the product of a multiplicand and multiplier including a multiplicand receiving device comprising a series chain of nine triggers each having first and second cross-connected grid-controlled tubes and two stable conditions alternately assumed; a connection from each trigger to the next higher trigger so that the stable condition of the former will determine the steady bias voltage impressed upon the grid of the second tube of the next higher trigger; means for placing said receiving device and the triggers thereof in a preselected starting condition; a source of pulses for sequentially switching each of said triggers; a coupling from said source to the control grid of the second tube of each trigger to switch a trigger to only one stable condition when the grid of that trigger has a certain bias voltage impressed thereon; a tenth trigger having two stable conditions and switchable from one to the other to control the steady bias voltage impressed upon the grid of the second tube of the first trigger in the chain to render it switchably responsive to a pulse from said source, such response of said first trigger causing a bias voltage to be applied to the grid of the second tube of the second trigger of the chain to render it switchably responsive to the next subsequent pulse from said source, and a connection from the ninth trigger of said chain to said tenth trigger to supply a steady bias voltage to the first tube thereof when the tenth trigger is switched from its preselected condition to permit said tenth trigger to be switched to its original stable condition by a subsequent pulse applied thereto from said source; first and second electronic gates connected to said multiplicand receiving device, said source and said tenth trigger and alternately conditioned and de-conditioned by the switching of said tenth trigger and responsive when conditioned to pulses from said source, said second gate-permitting pulses from said source to switch sequentially said nine triggers after said tenth trigger is switched from its original stable condition; a multiplier receiving device having a series chain of ten triggers for each order of the multiplier; a coincidence circuit responsive to a preselected voltage transfer from each order of said multiplier receiving device; an eleventh trigger connected to said coincidence circuit to be switchable from a preselected stable condition in response to the next pulse applied to said coincidence circuit after it is so responsive; a third electronic gate connected to said eleventh trigger and conditioned to be responsive when said eleventh trigger responds to said coincidence circuit and a connection from said third gate to said tenth trigger to switch it from its original stable condition when the third gate is rendered responsive, and a connection from said third gate to said source to render it responsive subsequent to its conditioning.

4. In an electronic multiplier a source of pulses; a multiplier receiving device responsive to said pulses and having a series chain of ten trigger circuits for each order of the multiplier; means for entering the digital values of each order of the multiplier into the multiplier receiving device so that a voltage change is transferred from the units, tens and hundreds orders thereof when those orders have received a number of pulses equal to the nine hundred and ninety ninths complement of the multiplier digit; a coincidence circuit responsive to said voltage changes; a multiplicand receiving device having a single order including a single series chain of nine trigger circuits to accommodate the entry of a multiplicand having a plurality of orders; a trigger circuit having two stable conditions and switchable from its original condition in response to the next pulse applied to said coincidence circuit after the occurrence of said voltage changes; pulse responsive means including a gate circuit connected between said last mentioned trigger circuit and said multiplicand receiving device and responsive to be conditioned by the switching of said trigger circuit from its original stable condition; and pulse means connected to said gate circuit for applying a pulse thereto to render it responsive when conditioned to permit pulse entries into said multiplicand receiving device; a connection from the tenth trigger of the highest order of said multiplier receiving device to said last-mentioned trigger circuit to switch it to its original condition in response to a switching of said tenth trigger to de-condition said gate circuit to prevent entries into said multiplicand receiving device.

5. In an electronic multiplier a source of pulses; a multiplier receiving device responsive to said pulses and having a series chain of ten trigger circuits for each order of the multiplier; means for entering the digital values of each order of the multiplier into the multiplier receiving device so that a voltage change is transferred from each order thereof when it has received a preselected number of pulses; a coincidence circuit responsive when said voltage changes are applied simultaneously thereto from each order; a multiplicand receiving device having a single order including a single series chain of nine trigger circuits to accommodate the entry of a multiplicand having a plurality of orders; a trigger circuit having two stable conditions and switchable from its original condition in response to the next pulse applied to said coincidence circuit after said voltage changes are applied thereto; pulse responsive means including a gate circuit connected between said last mentioned trigger circuit and said multiplicand receiving device and responsive to be conditioned by the switching of said trigger circuit from its original stable condition; pulse means connected to said gate circuit for applying a pulse thereto to render it responsive when conditioned to permit pulse entries into said multiplicand receiving device; a connection from the tenth trigger of the highest order of said multiplier receiving device to said last-mentioned trigger circuit to switch it to its original condition in response to a switching of said tenth trigger to de-condition said gate circuit to prevent entries into said multiplicand receiving device; a control circuit between said source of pulses and said multiplier receiving device for permitting and terminating pulse entries into said multiplier receiving device; a connection from said control circuit to the first trigger of the lowest order of said multiplier receiving device for transferring pulses thereto to effect cyclic operation of said lowest order; and a connection from the tenth trigger of the highest order of said multiplier receiving device to said control circuit to change the conductive condition thereof to prevent further entries into said multiplier receiving device.

6. In an electronic multiplier employing pulses occurring simultaneously and of opposite phase; a multiplicand receiving device having a plurality of stable conditions; a multiplicand pulse entry circuit for transferring pulses to said multiplicand receiving device to place it in only one stable condition in response to said pulses of one polarity and to advance sequentially the stable conditions thereof in response to said pulses of the other polarity; a result register; at least one electronic gate responsive to said pulses of said one polarity, when conditioned, to effect pulse transfer to said result register; means coupling said gate and said multiplicand receiving device to condition said gate in response to a predetermined number of pulses transferred to said multiplicand receiving device by said entry circuit; and a control circuit for preventing pulse transfer to said multiplicand receiving device in response to pulses of said other polarity at the time a pulse of said one polarity occurs to effect pulse transfer to said result register.

7. In an electronic multiplier wherein entries representing a multiplicand are made in accumulator fashion into a result register, the entries representing a given order of a multiplicand being made in the same order of the result register; a multiplicand receiving device including a series of digit-representing elements having two stable conditions and connected in cascade so that a change of each element, from the highest to the lowest digit representing element of the cascade to one stable condition causes a change in the stable condition of the next adjacent element in the cascade which element represents the next higher digit; means for placing each of said elements in a preselected starting condition; a plurality of digit-representing switches for each of said elements, each switch being representative of a digit of an order and having two terminals one of which is commonly connected to one terminal of each of the others and to one of said elements so that any switch when closed will transfer a voltage from the element connected thereto when said element is in said one stable condition; and a lead commonly connected to said other terminal over one of said switches connected to each of said elements, the voltage from a closed switch representing the highest digital value being transferred before a voltage is transferred from closed switches representing any lower digital values; and an electronic circuit responsive to the voltage transfer over each said lead connected to said other terminal to permit pulse entry into the corresponding order of said result register.

8. The multiplier set forth in claim 7 including a plurality of switches each corresponding to zero for different orders and having a commonly-connected terminal connected to a source of steady voltage insufficient to cause said electronic circuit to be responsive so that a multiplicand digit having a value of zero cannot effect pulse entry into said result register.

9. An electronic multiplier having an oscillator, a multiplicand receiving device and a multiplier receiving device connected to selectively initiate the cyclic sequential operation of the multiplicand receiving device; said multiplicand receiving device including a series of digit-representing triggers each having two stable conditions and connected in cascade so that a change of each trigger from the highest to the lowest digit representing trigger of the cascade to one stable condition causes a change in the stable condition of the next adjacent trigger in the cascade which trigger represents the next higher digit, means for placing each of said triggers in a preselected starting condition, a plurality of digit representing switches for each of said triggers, each switch being representative of a digit of an order and having two terminals one of which is commonly connected to one terminal of each of the others and to one of said triggers so that any switch when closed will transfer a voltage from the trigger connected thereto when said trigger is in one stable condition, and leads connected to the other terminal of said switches to transfer a voltage therefrom, the voltage from a closed switch representing the highest digital value, irrespective of its order, being transferred before a voltage is transferred from a closed switch representing any lower digital values; a circuit having two stable conditions and connected to always be switchable to one of said conditions in response to a predetermined cyclic operation of said multiplier receiving device; a first electronic gate, normally deconditioned, and connected to initiate the sequential operation of said multiplicand receiving device in response to pulse transfer from said circuit; a first connection from said circuit to said gate for transferring a bias voltage to condition said gate when said circuit is switched to said one condition; a second connection from said circuit to said multiplicand receiving device for transferring a bias voltage thereto to permit sequential operation of said multiplicand receiving device in response to successive pulse transfer from said gate when said circuit is switched to one said condition, a lead from said multiplicand receiving device to said circuit for cyclically transferring a bias voltage thereto to render said circuit electrically responsive to the output of said oscillator.

10. An electronic multiplier for effecting a multiplication of a multiplier and a multiplicand to obtain a product thereof including a multiplier receiving device having an order corresponding to each order of the multiplier; a multiplicand receiving device having a single order of counting elements to accommodate a multiplicand having a plurality of orders, said multiplicand receiving device including a single series chain of nine triggers corresponding respectively to the digits one to nine, inclusive, and sequentially switchable to one stable condition in response to pulses applied simultaneously to all said triggers, ten switches for each order of a multiplicand and corresponding respectively to the digits zero to nine, inclusive, the switches corresponding to each digit being connected to the trigger corresponding to that digit to transfer a positive voltage when the trigger is sequentially switched and that switch is closed, the switches corresponding to zero being connected to a source of negative voltage to transfer a negative voltage when closed, said switches being arranged so that only one can be closed at any one time; a result register having an order corresponding to each order of said product; a first source of pulses for effecting an operation of said multiplicand receiving device and said result register; a second source of pulses having a recurrence frequency determined by said first source of pulses; circuits coupling said sources of pulses and said multiplicand receiving device for permitting the selective operation of said multiplicand receiving device in response to said first source of pulses; and circuits coupling said second source of pulses and said multiplier receiving device for effecting the selective operation of said multiplier receiving device in response to pulses from said second source.

11. An electronic multiplier having a pulse responsive multiplier receiving device for receiving a multiplier; a pulse responsive multiplicand receiving device for receiving a multiplicand; a result register for indicating the product of the multiplier and multiplicand received into said multiplier receiving device and said multiplicand receiving device respectively; a source of pulses for operating said multiplier; circuits coupling said multiplier receiving device and said multiplicand receiving device so that a stable condition of the former determines the initiation and termination of pulse entry into the latter; circuits coupling said multiplicand receiving device to said result register so that the former determines pulse entry into the latter; said multiplicand receiving device including a series chain of nine triggers each having first and second cross connected grid controlled tubes and two stable conditions alternately assumed, a connection from each trigger to the next higher trigger in the chain so that the stable condition of the former will determine the steady bias voltage impressed upon the grid of the second tube of the next higher trigger; circuit means for placing said multiplicand receiving device in a preselected starting condition; and a coupling from said source to the control grid of the second tube of each trigger of said multiplicand receiving device to switch a trigger thereof to only one stable condition when a grid of that trigger has a certain bias voltage impressed thereon.

12. An electronic multiplier having a multiplier receiving device for receiving a multiplier; a multiplicand receiving device for receiving a multiplicand; a result register for indicating the product of the multiplier and multiplicand received into said multiplier receiving device and said multiplicand receiving device respectively; a source of pulses for operating said multiplier; circuits coupling said multiplier receiving device and said multiplicand receiving device so that a stable condition of the former determines the initiation and termination of pulse entry into the latter; circuits coupling said multiplicand receiving device to said result register so that the former determines pulse entry into the latter; said multiplicand receiving device comprising a series chain of nine triggers each having first and second cross connected trigger controlled tubes and two stable conditions alternately assumed, a connection from each trigger to the next higher trigger so that the stable condition of the former will determine the bias voltage impressed upon a grid of the second tube of the next higher trigger; means for placing said multiplicand receiving device and the triggers thereof in a preselected starting condition, a coupling from said source to the control grid to the second tube of each trigger of the multiplicand receiving device to switch a trigger thereof to only one stable condition when a grid of that trigger has a certain bias voltage impressed thereon; a tenth trigger having two stable conditions and switchable from one to the other to control the steady bias voltage impressed upon a grid of the second tube of the first trigger of the said multiplicand receiving device to render it switchably responsive to a pulse from said source, such response of said first trigger causing a bias voltage to be applied to a grid of the second tube of the second trigger of said multiplicand receiving device to render said second trigger switchably responsive to the next subsequent pulse from said source.

13. A multiplier as set forth in claim 12 including first and second multi-grid gate tubes alternately conditioned and deconditioned and connected between said source and said multiplicand receiving device, said first and second gate tubes being responsive respectively to positive and negative pulses from said source; and connections from the first and second tubes respectively of said tenth trigger to a grid of said first and second gate tubes to change the condition thereof in response to the stable condition of said tenth trigger.

14. A multiplier as set forth in claim 13 wherein said circuits coupling said multiplier receiving device and said multiplicand receiving device include a coincidence pulse-responsive circuit for permitting a switching of said tenth trigger to only one stable condition.

15. An electronic multiplier having a multiplier receiving device and a multiplicand receiving device; said multiplicand receiving device including a series chain of nine triggers each having first and second cross connected grid controlled tubes in two stable conditions alternately assumed; a connection from each trigger to the next higher trigger so that the stable condition of the former will determine the steady bias voltage impressed upon the grid of the second tube of the next higher trigger, means for placing said receiving device in a preselected starting condition, a source of pulses for sequentially switching each of said triggers, a coupling from said source to the control grid of the second tube of each trigger to switch a trigger to only one stable condition when the grid of that trigger has a certain bias voltage impressed thereon, a tenth trigger having two stable conditions and switchable from one to the other to control the steady bias voltage impressed upon the grid of the second tube of the first trigger in the chain to render it switchably responsive to a pulse from said source, such response of said first trigger causing a bias voltage to be applied to the grid of the second tube of the second trigger of the chain to render it switchably responsive to the next subsequent pulse from said source, and a connection from the ninth trigger of said chain to said tenth trigger to supply a steady bias voltage to the first tube thereof when the tenth trigger is switched from its preselected condition to permit said tenth trigger to be switched to its original stable condition by a subsequent pulse applied thereto from said source; a result register for receiving and indicating the product of a multiplicand and multiplier entered into said multiplicand receiving device and said multiplier receiving device respectively, said result register having a separate order corresponding to each order of said product; circuit means for entering said multiplicand into said result register by simultaneous pulse entry to a plurality of orders thereof; and a buffer circuit, normally non-responsive, connected between two of said orders so that when one of said orders completes a cycle of operation said buffer tube is rendered responsive to permit the transfer of a pulse to the other of said orders before a subsequent multiplicand pulse entry is made therein.

16. The multiplier set forth in claim 15 including first and second electronic gates alternately conditioned and deconditioned by the switching of said tenth trigger and responsive to pulses from said source, said second gate permitting pulses from said source to switch sequentially said nine triggers only after said tenth trigger is switched from its original stable condition.

17. In an electronic multiplier a source of pulses; a multiplier receiving device connected to be responsive to said pulses and having a series chain of ten trigger circuits for each order of the multiplier; means for entering the digital values of each order of the multiplier into the multiplier receiving device so that a voltage change is transferred from the units, tens and hundreds order thereof when those orders have received a number of pulses equal to the nine hundred and ninety ninths complement of the multiplier digit; a coincidence circuit responsive to the coincidence of three preselected voltages and the removal of one of said three voltages therefrom including a first multi-grid tube having a plate load and plate current conductive only when voltages are applied simultaneously to two grids thereof, a first grid controlled tube having a plate load and normally non-plate current conductive; the first voltage divider including the plate load of said first multi-grid tube and a connection from said first divider to a grid of said first grid controlled tube to render the latter plate current conductive when the former is non-plate current conductive and vice versa, a second multi-grid tube having a plate load, a second voltage divider including the plate load of said first grid controlled tube and a connection from said second divider to a grid of said second multi-grid tube to condition the latter when the former is rendered non-plate current conductive and to decondition the latter when the former is rendered plate current conductive, means for applying a voltage to another grid of said second multi-grid tube to render it plate current conductive only when it is conditioned, a second grid controlled tube, a third voltage divider including said plate load of said multi-grid tube and a connection from said third divider to a grid of said grid controlled tube to render it plate current conductive when the said second multi-grid tube is rendered non-plate current conductive and to render the former plate current conductive when the latter is non-plate current conductive; a multiplicand receiving device having a single order including a single series chain of nine trigger circuits to accommodate the entry of a multiplicand having a plurality of orders; a trigger circuit having two stable conditions and connected to be switchable from its original condition in response to said coincidence circuit to permit pulse entries into said multiplicand receiving device and a connection from the tenth trigger of the highest order of said multiplier receiving device to said last mentioned trigger circuit to switch it to its original condition in response to a switching of said tenth trigger thereby to prevent entries into said multiplicand receiving device.

18. An electronic multiplier having a multiplier receiving device for receiving a multiplier; a multiplicand receiving device for receiving a multiplicand; said multiplicand receiving device including a plurality of digit-representing elements having two stable conditions and connected in cascade so that a change of each element to one stable condition causes a change in the stable condition of the next higher one, means for placing each of said elements in a preselected starting condition, a plurality of digit-representing switches for each of said elements, each switch being representative of an order and having two terminals one of which is commonly connected to one terminal of each of the others and to one of said elements so that any switch when closed will transfer a voltage from the element connected thereto when said element is changed to said one stable condition, and leads connected to the other terminals of said switches to transfer a voltage therefrom; a result register for indicating the product of the multiplier and multiplicand received into said multiplier receiving device and multiplicand receiving device respectively; a source of pulses for operating said multiplier; circuits coupling said multiplier receiving device and said multiplicand receiving device so that a stable condition of the former determines the initiation and termination of pulse entry into the latter; and circuits coupling said multiplicand receiving device to said result register so that the former determines pulse entry into the latter whereby said multiplicand is entered into said result register a number of times equal to the multiplier.

19. In a multiplier cyclically operable in response to pulses a multi-order multiplicand receiving device including a single series chain of nine triggers corresponding respectively to the digits one to nine, inclusive, and sequentially switchable to one stable condition in response to pulses applied simultaneously to all said triggers; ten switches, arranged so that only one can be closed at any one time, for each order of a multiplicand and corresponding respectively to the digits zero to nine, inclusive, the switches corresponding to each digit being connected to the trigger corresponding to that digit to transfer a positive voltage when the trigger is sequentially switched and that switch is closed, the switches corresponding to zero being connected to a source of negative voltage to transfer a negative voltage when closed; a multi-order result register; an electronic gate, normally de-conditioned and connected between each order of said switches and a corresponding order of said result register so that said gate is conditioned only when a number of pulses is applied to said receiving device equal to the tens complement of the digit corresponding to the closed switch of that order.

ARTHUR H. DICKINSON.

References Cited in the file of this patent

UNITED STATES PATENTS

| Number | Name | Date |
|---|---|---|
| 2,398,771 | Compton | Apr. 23, 1946 |
| 2,402,988 | Dickinson | July 2, 1946 |
| 2,402,989 | Dickinson | July 2, 1946 |
| 2,403,873 | Mumma | July 9, 1946 |
| 2,403,918 | Grosdoff | July 16, 1946 |
| 2,404,047 | Flory et al. | July 16, 1946 |
| 2,409,689 | Morton et al. | Oct. 22, 1946 |
| 2,411,714 | De Rosen | Nov. 26, 1946 |
| 2,416,095 | Gulden | Feb. 18, 1947 |
| 2,442,403 | Flory et al. | June 1, 1948 |
| 2,442,428 | Mumma | June 1, 1948 |
| 2,456,818 | Dickinson | Dec. 21, 1948 |
| 2,484,115 | Palmer et al. | Oct. 11, 1949 |
| 2,486,491 | Meacham | Nov. 1, 1949 |
| 2,516,189 | Dinsmore | July 25, 1950 |
| 2,519,184 | Grosdoff | Aug. 15, 1950 |
| 2,575,331 | Compton | Nov. 20, 1951 |
| 2,587,979 | Dickinson | Mar. 4, 1952 |